United States Patent
Nagai

(10) Patent No.: US 8,392,941 B2
(45) Date of Patent: Mar. 5, 2013

(54) CONTENTS VIEWING AND LISTENING MANAGEMENT APPARATUS, CONTENT VIEWING AND LISTENING MANAGEMENT METHOD, PROGRAM, AND CONTENTS VIEWING AND LISTENING MANAGEMENT SYSTEM

(75) Inventor: Ayako Nagai, Tokyo (JP)

(73) Assignee: Sony Corporation, Tokyo (JP)

( * ) Notice: Subject to any disclaimer, the term of this patent is extended or adjusted under 35 U.S.C. 154(b) by 470 days.

(21) Appl. No.: 12/335,027

(22) Filed: Dec. 15, 2008

(65) Prior Publication Data
US 2009/0204984 A1 Aug. 13, 2009

(30) Foreign Application Priority Data
Dec. 14, 2007 (JP) .................. 2007-323633

(51) Int. Cl.
*H04N 7/16* (2006.01)
*H04N 7/173* (2006.01)
*G06F 7/04* (2006.01)
*G06F 17/30* (2006.01)

(52) U.S. Cl. .............. 725/28; 725/6; 725/104; 725/118; 725/131; 725/151; 725/27; 725/114; 726/28

(58) Field of Classification Search .................. 725/5, 6, 725/28, 104, 118, 131, 133, 141, 151, 153, 725/27, 114; 726/28; 386/261
See application file for complete search history.

(56) References Cited

U.S. PATENT DOCUMENTS

| | | | |
|---|---|---|---|
| 6,922,843 B1 * | 7/2005 | Herrington et al. | 725/30 |
| 7,367,040 B2 * | 4/2008 | Yamauchi | 725/28 |
| 7,437,772 B1 * | 10/2008 | Thenthiruperai et al. | 726/30 |
| 7,720,463 B2 * | 5/2010 | Marsico | 455/410 |
| 7,860,250 B2 * | 12/2010 | Russ et al. | 380/234 |
| 7,861,258 B2 * | 12/2010 | Barton et al. | 725/28 |
| 7,904,473 B2 * | 3/2011 | Damick et al. | 707/781 |
| 2002/0056588 A1 * | 5/2002 | Kuze et al. | 180/444 |

(Continued)

FOREIGN PATENT DOCUMENTS

| | | |
|---|---|---|
| JP | 2003-186842 | 7/2003 |
| WO | WO 02/01864 A1 | 1/2002 |

(Continued)

OTHER PUBLICATIONS

European Search Report dated Apr. 6, 2009, in corresponding application No. 08253985-9-2413.

*Primary Examiner* — Pinkal R Chokshi
(74) *Attorney, Agent, or Firm* — Finnegan, Henderson, Farabow, Garrett & Dunner LLP

(57) ABSTRACT

With a contents viewing and listening management method using a contents viewing and listening management apparatus, a viewing and listening request of a content is made for displaying a predetermined content. Information relating to users whose viewing and listening of the relevant predetermined content is restricted, and information relating to administrators who manage viewing and listening of a content by the users are managed. If restriction is set to a content relating to the viewing and listening request, a relevant user ID is obtained. Whether or not the requested is a content of which viewing and listening has been permitted by the administrator as to each of the users is determined. If the content of which the viewing and listening has been requested is not permitted, a message which requests permission for viewing and listening of the requested content is transmitted to a second terminal possessed by the administrator.

12 Claims, 13 Drawing Sheets

U.S. PATENT DOCUMENTS

| | | |
|---|---|---|
| 2002/0059588 A1 | 5/2002 | Huber et al. |
| 2003/0028622 A1* | 2/2003 | Inoue et al. ............... 709/219 |
| 2003/0030751 A1* | 2/2003 | Lupulescu et al. ........... 348/552 |
| 2003/0041326 A1* | 2/2003 | Novak et al. ................ 725/25 |
| 2003/0103627 A1* | 6/2003 | Nierzwick et al. ........... 380/240 |
| 2004/0015985 A1* | 1/2004 | Kweon ...................... 725/30 |
| 2005/0022229 A1* | 1/2005 | Gabriel et al. .............. 725/28 |
| 2005/0086683 A1* | 4/2005 | Meyerson ................... 725/30 |
| 2006/0190402 A1* | 8/2006 | Patron et al. ................ 705/51 |
| 2006/0259778 A1* | 11/2006 | Gudorf et al. ............... 713/186 |
| 2007/0067794 A1* | 3/2007 | Russell et al. .............. 725/25 |
| 2007/0107017 A1* | 5/2007 | Angel et al. ................ 725/62 |
| 2007/0150918 A1* | 6/2007 | Carpenter et al. ............ 725/25 |

FOREIGN PATENT DOCUMENTS

| | | |
|---|---|---|
| WO | WO 0201864 A1 * | 1/2002 |
| WO | WO 2007/073422 A1 | 6/2007 |

* cited by examiner

FIG. 8A

| ADMINISTRATOR ID | ADMINISTRATOR ADDRESS | USER ID |
|---|---|---|
| 4993 | msmith@***.com | 0361 |
| 4993 | msmith@***.com | 109342 |
| ⋮ | ⋮ | ⋮ |

FIG. 8B

| USER ID | USER NAME | USER ADDRESS | CONTENT ID |
|---|---|---|---|
| 0361 | George Smith | gsmith@***.com | a000001 |
| 0361 | George Smith | gsmith@***.com | a010101 |
| 0361 | George Smith | gsmith@***.com | b000001 |
| ⋮ | ⋮ | ⋮ | ⋮ |
| 109342 | John Smith | jsmith@***.com | a010101 |
| ⋮ | ⋮ | ⋮ | ⋮ |

FIG. 8C

| USER ID | USER NAME | RESTRICTION CONTENT |
|---|---|---|
| 0361 | George Smith | R15 OR HIGHER NEEDS RESTRICTION |
| 109342 | John Smith | R12 OR HIGHER NEEDS RESTRICTION |
| 000218 | Charles Smith | ALL CONTENTS ARE AVAILABLE |
| ⋮ | ⋮ | ⋮ |

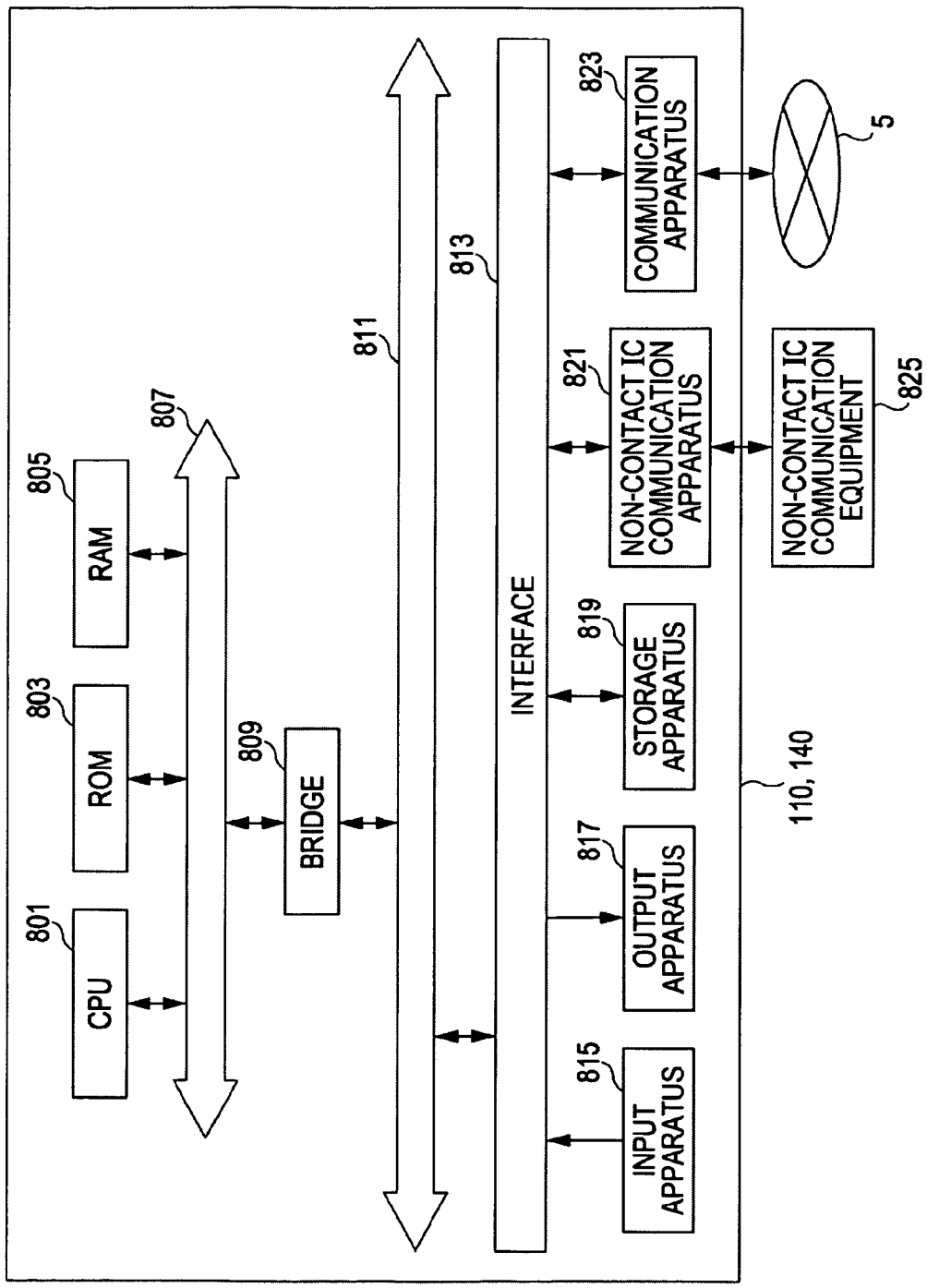

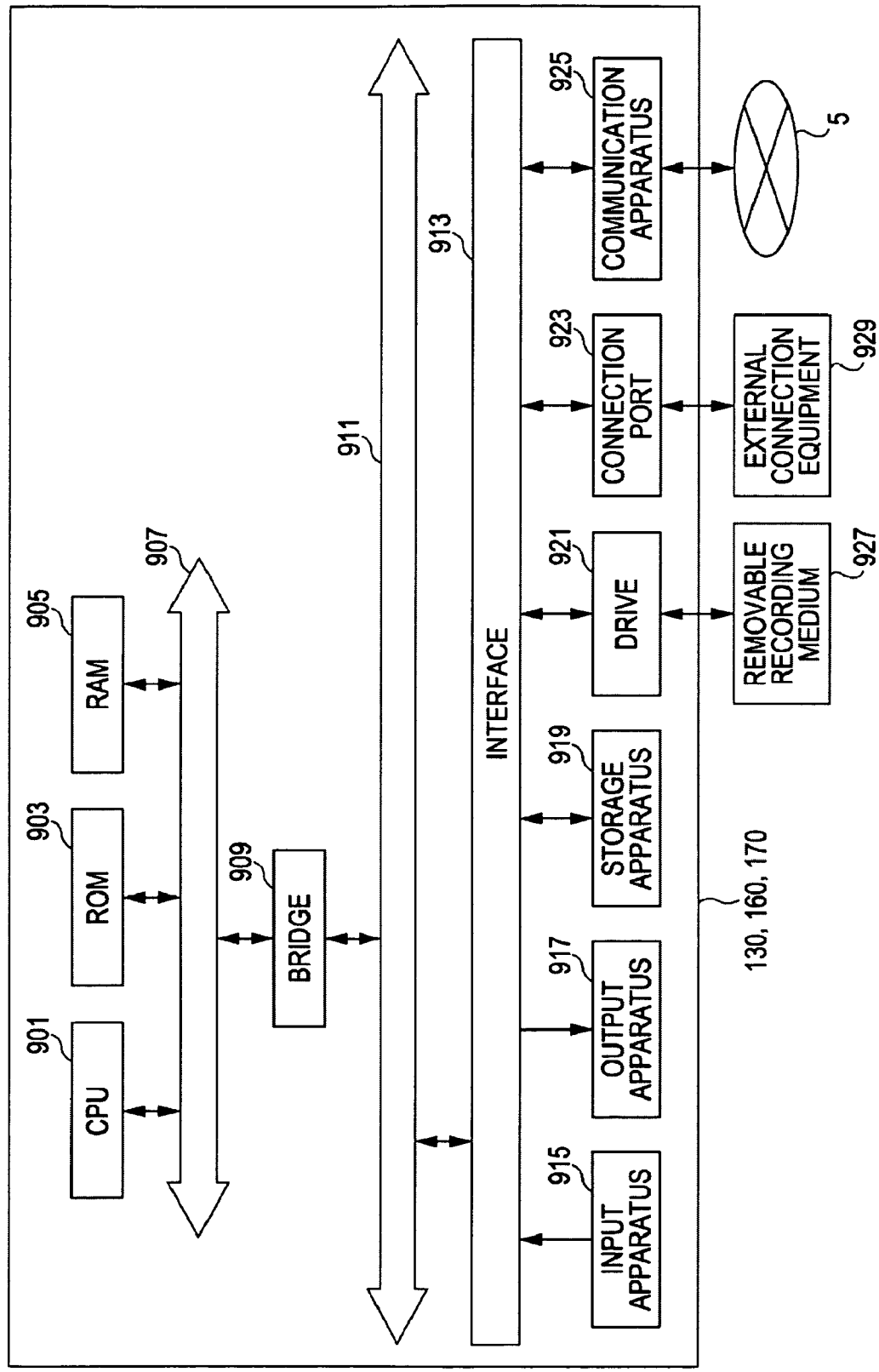

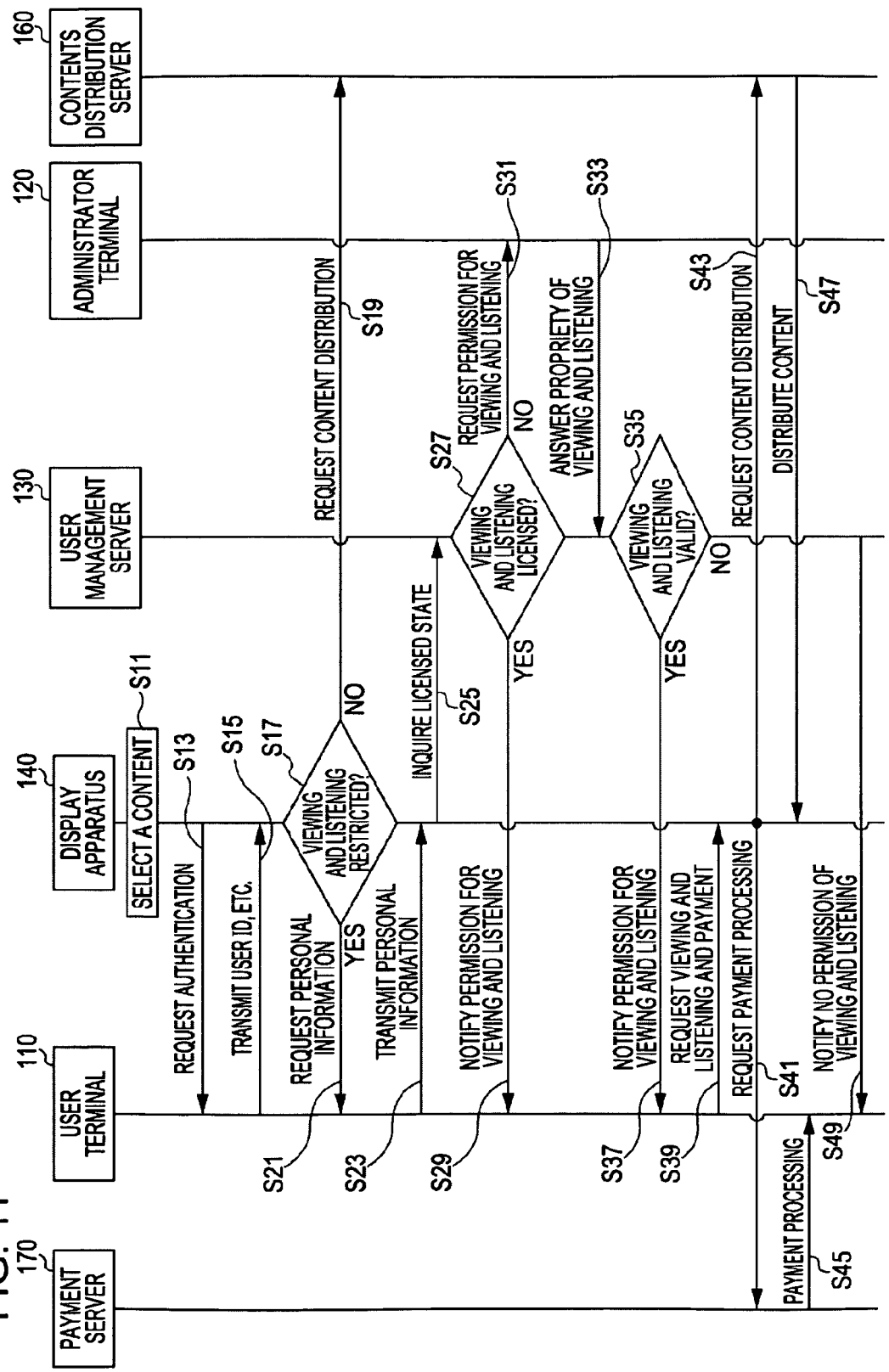

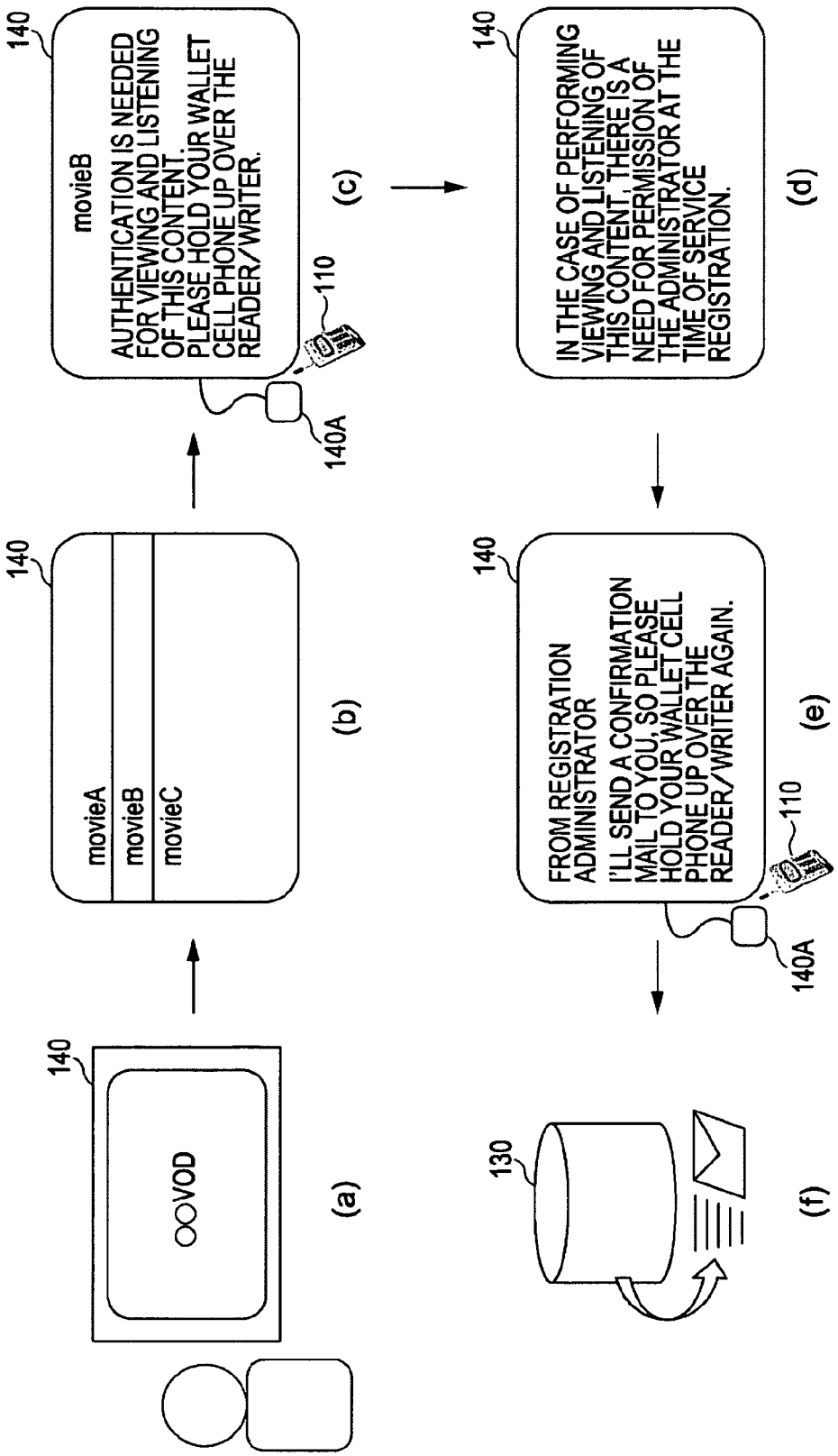

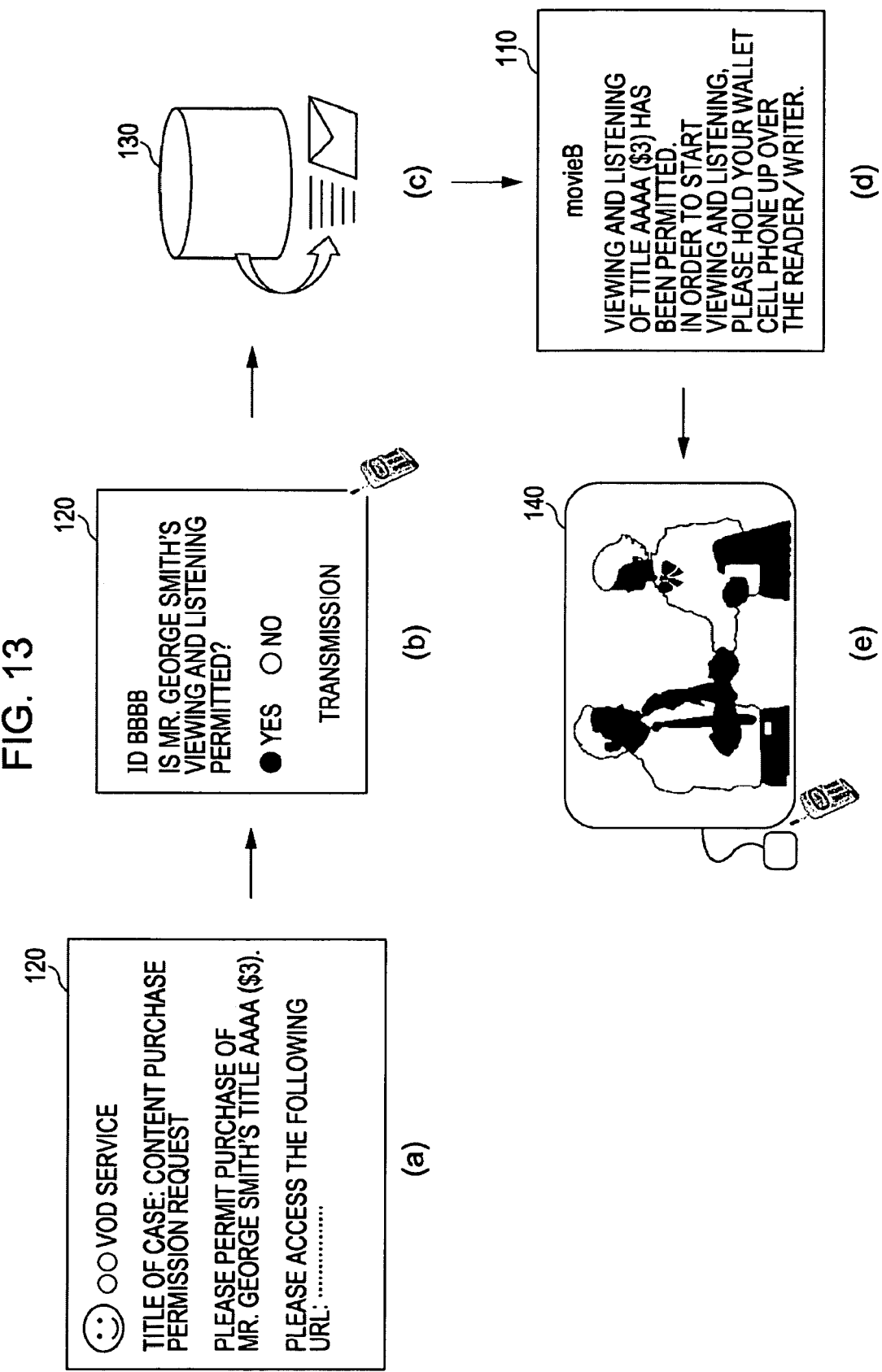

CONTENTS VIEWING AND LISTENING MANAGEMENT APPARATUS, CONTENT VIEWING AND LISTENING MANAGEMENT METHOD, PROGRAM, AND CONTENTS VIEWING AND LISTENING MANAGEMENT SYSTEM

CROSS REFERENCES TO RELATED APPLICATIONS

The present invention contains subject matter related to Japanese Patent Application JP 2007-323633 filed in the Japanese Patent Office on Dec. 14, 2007, the entire contents of which are incorporated herein by reference.

BACKGROUND OF THE INVENTION

1. Field of the Invention

The present invention relates to a contents viewing and listening management apparatus, a contents viewing and listening management method, a program, and a contents viewing and listening management system.

2. Description of the Related Art

With the evolution of information communication technology, various contents now can be readily downloaded through the Internet by employing communication equipment which can be connected to the Internet. Also, in recent years, the overall age of users who have communication terminals has been decreased due to lowering of the price of communication terminals such as cell phones, increase of cases wherein a parent gives a child a cell phone or the like for safety reasons, and so forth. Therefore, there are situations wherein children can readily even download content of which the viewing and listening is restricted by age or the like, from a cell phone or the like, and can view and listen to the content thereof.

Also, recently, cell phones, IC cards, and so forth which have a non-contact IC communication function have increased, and various types of payments can be completed simply by holding such a cell phone or the like up over a reader/writer for non-contact IC communication, or the like, which is highly convenient to users. Conversely, such convenience allows even a child to readily perform payment, which increases the risk of the child being able to purchase content of which the viewing and listening is restricted, and to view and listen this without any restriction.

Technology has been proposed in Japanese Unexamined Patent Application Publication No. 2003-186842 wherein access from a cell phone to a site over the Internet is restricted to bookmarks registered beforehand by a person with parental authority over the underage user of this cell phone.

SUMMARY OF THE INVENTION

However, with the technology described in Japanese Unexamined Patent Application Publication No. 2003-186842, a user is shut out of sites other than those registered by a person with parental authority, regardless of what is actually in the content, resulting in a problem wherein flexibility of the Internet usage is deprived greatly.

Also, the technology described in Japanese Unexamined Patent Application Publication No. 2003-186842 has a problem in that viewing and listening (browsing) of a content of which the viewing and listening is restricted can be restricted, but purchase of the relevant content is not restricted.

There has been realized demand to increase flexibility of Internet usage with a contents viewing and listening management apparatus, contents viewing and listening management method, program, and contents viewing and listening management system, which manage viewing and listening of contents by users whose viewing and listening of a predetermined content is restricted, and also to restrict purchase of a content of which the viewing and listening is restricted.

According to an embodiment of the present invention, a contents viewing and listening management apparatus, which is connected through a network to first terminals employed by users whose viewing and listening of a predetermined content is restricted, second terminals employed by administrators who manage viewing and listening of a content by the users, and a display apparatus for displaying a predetermined content, for managing information relating to the users and the administrators, includes: a storage unit in which a licensed contents list relating to contents of which the viewing and listening is permitted as to each of the users is recorded in a correlated manner with user IDs for identifying the users; a user information obtaining unit for obtaining the relevant user ID from the display apparatus which obtained from the first terminal, in response to a viewing and listening request regarding a predetermined content, in a case wherein the display apparatus determines that viewing and listening restriction is set to the relevant content; a viewing and listening licensed state determining unit for determining whether or not viewing and listening of the content of which the viewing and listening has been requested is permitted by the administrator based on the licensed contents list and the user ID; and a viewing and listening permission request transmission unit for transmitting a message for requesting permission for viewing and listening of the content of which the viewing and listening has been requested, to the second terminal, in a case wherein the content of which the viewing and listening has been requested is not permitted to be viewed and listened.

Here, the contents viewing and listening management apparatus may further include a viewing and listening licensed information obtaining unit for obtaining viewing and listening licensed information relating to propriety of permission for viewing and listening determined by the administrator as to the content of which the viewing and listening has been requested, from the second terminal, and a viewing and listening licensed information providing unit for providing the obtained viewing and listening licensed information, and licensed content information for identifying the content of which the viewing and listening has been permitted, to the first terminal.

Also, the licensed contents list may include the user IDs, information for identifying the content of which the viewing and listening has been permitted, which has been correlated with each of the user IDs, and an e-mail address of the relevant user correlated with each of the user IDs.

Also, an administrator list may further be recorded in the storage unit, which includes administrator IDs for identifying the administrators, an e-mail address of the relevant administrator correlated with each of the administrator IDs, and the user IDs of the users whose viewing and listening of a content is managed by the relevant administrator correlated with each of the administrator IDs.

Also, the contents viewing and listening management apparatus may further include an administrator information registration unit for registering information relating to the administrator in response to a request from the second terminal, and generating the administrator list.

According to an embodiment of the present invention, there is provided a contents viewing and listening management method employing a contents viewing and listening management apparatus wherein, in a case in which a viewing and listening request of a predetermined content has been performed as to a display apparatus for displaying a predetermined content, information relating to users whose viewing and listening of the relevant predetermined content is restricted, and information relating to administrators who manage viewing and listening of a content by the users are managed, the method including the steps of: obtaining the relevant user ID from the display apparatus which obtained user IDs for identifying the users from first terminals employed by the users, in a case wherein determination is made that in response to the viewing and listening request, viewing and listening restriction is set to a content relating to the viewing and listening request; determining whether or not the content of which the viewing and listening has been requested is a content of which the viewing and listening has been permitted by the administrator based on a licensed contents list relating to contents of which the viewing and listening has been permitted as to each of the users, which the content viewing listening management apparatus includes, and the user ID; and transmitting a message which requests permission for viewing and listening of the content of which the viewing and listening has been requested, to the second terminal possessed by the administrator, in a case wherein the content of which the viewing and listening has been requested is not permitted to be viewed and listened.

According to an embodiment of the present invention, there is provided a program for executing processing with a contents viewing and listening management apparatus, which is connected through a network to first terminals employed by users whose viewing and listening of a predetermined content is restricted, second terminals employed by administrators who manage viewing and listening of a content by the users, and a display apparatus for displaying a predetermined content, for managing information relating to the users and the administrators, the program causing a computer to realize: a recording function for recording a licensed contents list relating to contents of which the viewing and listening is permitted as to each of the users in a correlated manner with user IDs for identifying the users; a user information obtaining function for obtaining the relevant user ID from the display apparatus which obtained from the first terminal, in response to a viewing and listening request regarding a predetermined content, in a case wherein the display apparatus determines that viewing and listening restriction is set to the relevant content; a viewing and listening licensed state determining function for determining whether or not the content of which the viewing and listening has been requested is permitted by the administrator based on the licensed contents list and the user ID; and a viewing and listening permission request transmitting function for transmitting a message for requesting permission for viewing and listening of the content of which the viewing and listening has been requested, to the second terminal, in a case wherein the content of which the viewing and listening has been requested is not permitted to be viewed and listened.

According to such a configuration, the computer program is stored in a storage unit included in the computer, and is read out and executed by a CPU included in the computer, thereby functionalizing the computer as the above-mentioned contents viewing and listening management apparatus. Also, there can be provided a computer-readable recording medium in which the computer program is recorded. Examples of this recording medium include a magnetic disk, optical disc, magneto-optical disk, and flash memory. Also, the computer program may be distributed, for example, through a network without employing the recording medium.

According to an embodiment of the present invention, there is provided a contents viewing and listening management system including: first terminals employed by users whose viewing and listening of a predetermined content is restricted; second terminals employed by administrators who manage viewing and listening of a content by the users; a user management server for managing information relating to the users and the administrators; a display apparatus for displaying a predetermined content; and a contents distribution server for distributing a content to the display apparatus.

With the contents viewing and listening management system, the first terminal includes a storage unit in which user IDs for determining the users are recorded, and a user information providing unit for providing at least the user ID to the display apparatus. Also, the display apparatus includes a storage unit in which a viewing and listening restriction list which is viewing and listening restriction information relating to contents of which the viewing and listening by each of the users is restricted is recorded in a correlated manner with the user IDs, a meta data obtaining unit for obtaining meta data of a single or multiple contents from the contents distribution server, a user information obtaining unit for obtaining at least the user ID from the first terminal, a viewing and listening restriction determining unit for determining whether or not viewing and listening restriction of the relevant content has been set based on the meta data, the user ID, the viewing and listening restriction list in response to a viewing and listening request regarding a predetermined content, and a user information providing unit for providing the user ID obtained from the first terminal to the user management server in a case wherein determination is made that the viewing and listening restriction has been set. Also, the user management server includes a storage unit in which a licensed contents list of contents of which the viewing and listening has been permitted as to each of the users is recorded in a correlated manner with the user IDs, a user information obtaining unit for obtaining the user ID from the display apparatus, a viewing and listening licensed state determining unit for determining whether or not the content of which the viewing and listening has been requested is permitted to be viewed and listened by the administrator based on the licensed contents list and the user ID, and a viewing and listening permission request transmitting unit for transmitting a message for requesting permission for viewing and listening of the content of which the viewing and listening has been requested, to the second terminal, in a case wherein the content of which the viewing and listening has been requested is not permitted to be viewed and listened. Also, the second terminal includes a viewing and listening permission request receiving unit for receiving the message which requests permission for viewing and listening.

Here, the second terminal may further include an input unit for inputting viewing and listening information relating to propriety of permission for viewing and listening determined by the administrator as to the content of which the viewing and listening has been requested, and a viewing and listening licensed information providing unit for providing the viewing and listening licensed information to the user management server, and the user management server may further include a viewing and listening licensed information obtaining unit for obtaining the viewing and listening licensed information corresponding to the content of which the viewing and listening has been requested, from the second terminal, and a viewing and listening licensed information providing unit for providing the obtained viewing and listening licensed information, and licensed content information for identifying the content of which the viewing and listening has been permitted, to the first terminal.

Also, the first terminal may further include a viewing and listening licensed information obtaining unit for obtaining the viewing and listening licensed information, and the licensed content information from the user management server, with the user information providing unit of the first terminal providing the obtained viewing and listening licensed information and the licensed content information to the display apparatus. The display apparatus may further include a viewing and listening licensed information obtaining unit for obtaining the viewing and listening licensed information and the licensed content information from the first terminal or the user management server, a contents distribution request unit for transmitting a distribution request of the content of which the viewing and listening has been permitted to the contents distribution server together with the viewing and listening licensed information and the licensed content information, a content obtaining unit for obtaining the content of which the viewing and listening has been permitted from the contents distribution server in response to the content distribution request, and a content playback unit for playing the obtained content of which the viewing and listening has been permitted.

Also, the contents viewing and listening management system may further include a payment server for performing payment processing as to purchase of a predetermined content. The display apparatus may further include a payment processing request unit for requesting payment processing as to purchase of the content of which the viewing and listening has been permitted, to the payment server, in the case of obtaining the viewing and listening licensed information and the licensed content information. The payment server may include a payment processing unit for performing payment processing as to purchase of the content of which the viewing and listening has been permitted, as to the first terminal, in response to a request for payment processing by the payment processing request unit.

Also, the licensed contents list may include the user IDs, information for identifying the content of which the viewing and listening has been permitted, which has been correlated with each of the user IDs, and an e-mail address of the relevant user correlated with each of the user IDs.

Also, an administrator list may further be recorded in the storage unit of the user management server, which includes administrator IDs for identifying the administrators, an e-mail address of the relevant administrator correlated with each of the administrator IDs, and the user IDs of the users whose viewing and listening of a content is managed by the relevant administrator correlated with each of the administrator IDs.

Also, the viewing and listening restriction list may include the user IDs, the name of the relevant user correlated with each of the user IDs, and restricted content information showing the content of viewing and listening restriction of the relevant user correlated with each of the user IDs.

Also, the first terminal may be an IC card.

According to such a contents viewing and listening management apparatus, contents viewing and listening management method, program, and contents viewing and listening management system, according to the present invention, advantages such as the following are obtained. That is to say, first, users to be managed by an administrator, the content of viewing and listening restriction as to the users thereof, and so forth are registered in the contents viewing and listening management apparatus (user management server in the contents viewing and listening management system) beforehand. Subsequently, in a case wherein a viewing and listening request as to a predetermined content is received from a registered user, confirmation is made whether or not the viewing and listening of the relevant content is permitted. As a result thereof, in a case wherein the viewing and listening is not permitted, a viewing and listening permission request message is transmitted to the terminal of the administrator individually, thereby eliminating having to apply access restriction to the terminal of the user beforehand, and accordingly, flexibility of the Internet usage by users can be improved. Also, according to the contents viewing and listening management apparatus, contents viewing and listening management method, program, and contents viewing and listening management system, according to the present invention, a content purchase permission request can be transmitted to the administrator's terminal instead of or together with a viewing and listening permission request. Accordingly, restriction can also be applied to purchase of a content of which the viewing and listening is restricted.

According to the above configurations, with a contents viewing and listening management apparatus, contents viewing and listening management method, program, and contents viewing and listening management system, which manage the viewing and listening of a content by a user whose viewing and listening of a predetermined content is restricted, flexibility of the Internet usage can be improved, and also restriction can be applied to purchase of a content of which the viewing and listening is restricted.

BRIEF DESCRIPTION OF THE DRAWINGS

FIGS. 8A through 8C are explanatory diagrams illustrating examples of various lists employed with the embodiment, wherein FIG. 8A is an explanatory diagram illustrating an example of an administrator list according to the embodiment, FIG. 8B is an explanatory diagram illustrating an example of a licensed contents list according to the embodiment, and FIG. 8C is an explanatory diagram illustrating an example of a viewing and listening restricting list according to the embodiment;

FIG. 9 is a block diagram illustrating a hardware configuration of a first terminal (or display apparatus) according to the embodiment;

FIG. 10 is a block diagram illustrating a hardware configuration of a second terminal (or user management server or contents distribution server or payment server) according to the embodiment;

FIG. 11 is an explanatory diagram illustrating a processing flow with a contents viewing and listening management system according to the embodiment;

FIG. 12 is an explanatory diagram illustrating an example of a GUI with each processing shown in FIG. 11;

FIG. 13 is an explanatory diagram illustrating an example of a GUI with each processing shown in FIG. 11.

DESCRIPTION OF THE PREFERRED EMBODIMENTS

Figure 1:
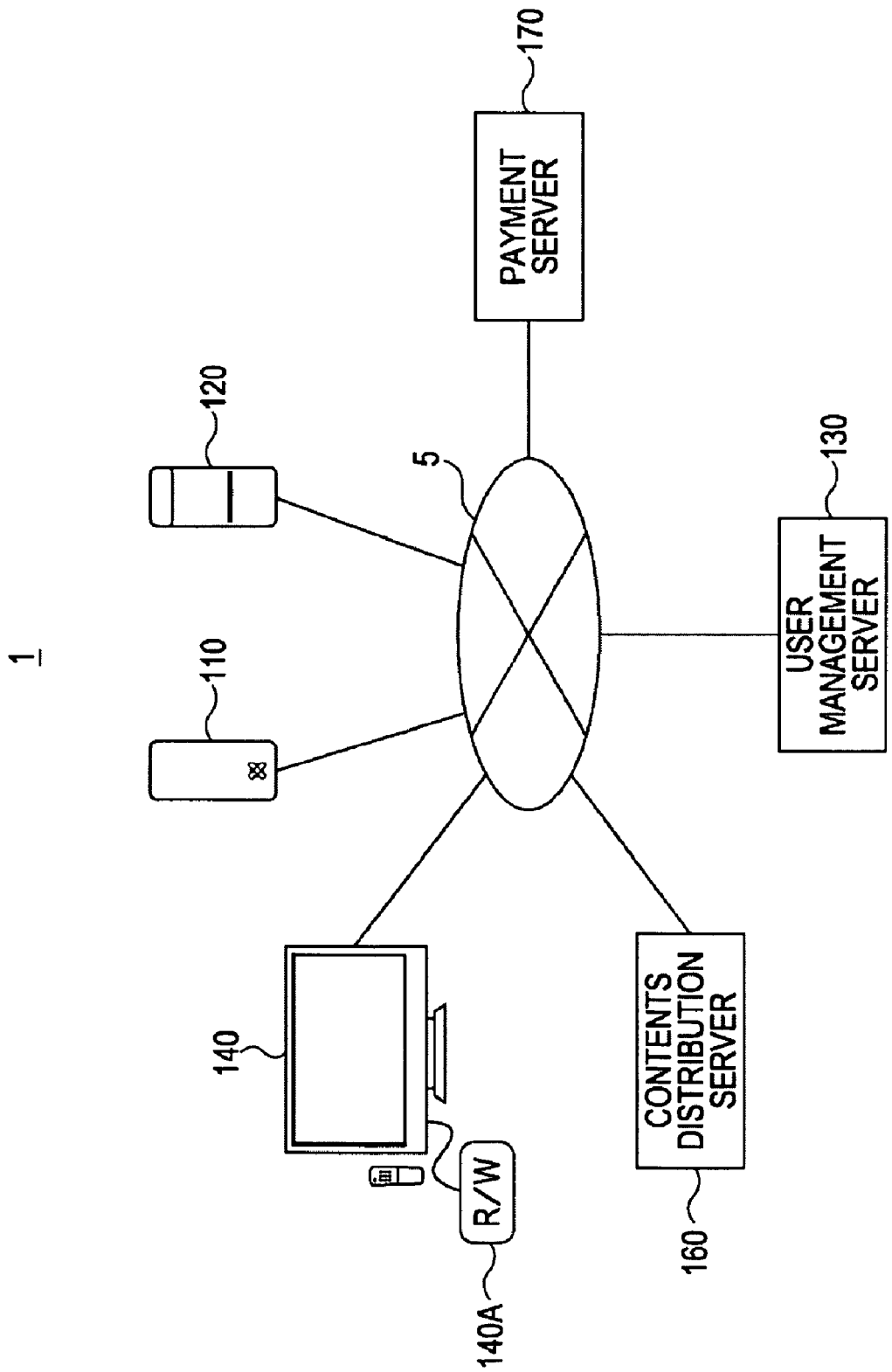
FIG. 1 is an explanatory diagram illustrating a configuration of a contents viewing and listening management system according to an embodiment of the present invention.

Preferred embodiments of the present invention will be described below in detail with reference to the appended drawings. Note that with the present Specification and drawings, components having substantially the same functional configurations will be denoted with the same reference numerals, thereby avoiding redundant description.

Configuration of Contents Viewing and Listening Management System 1

First, an overall configuration of a contents viewing and listening management system 1 according to an embodiment of the present invention will be described with reference to FIG. 1. Note that FIG. 1 is an explanatory diagram illustrating a configuration of the contents viewing and listening management system 1 according to an embodiment of the present invention.

The contents viewing and listening management system 1 according to the present embodiment is a system wherein in a case in which a user who attempts to view and listen a content has not obtained permission for viewing and listening relating to the content thereof, the user can ask an administrator for viewing and listening permission. Specifically, as shown in FIG. 1, the contents viewing and listening management system 1 according to the present embodiment principally includes a user terminal 110 employed by a user, an administrator terminal 120 employed by an administrator, a user management server 130, a display apparatus 140, a contents distribution server 160, and a payment server 170.

The user terminal 110 is an example of a first terminal according to the present embodiment, and a terminal apparatus employed by a user (e.g., person under age) whose viewing and listening of a predetermined content (e.g., a content set with R-rating, a adult content, or the like) is restricted. The user terminal 110 has a communication function of a user ID for determining a user. Examples of this user ID include an ID for payment employed for payment processing at the time of a particular user purchasing a content. Also, it is not asked whether the user terminal 110 is a portable terminal or fixed terminal as long as the terminal 110 has a function for communicating a user ID with a later-described display apparatus 140, e.g., the user terminal 110 may be a cell phone having a non-contact IC communication function, or may be an IC card having a non-contact IC communication function. Also, the user terminal 110 may be a terminal, such as a cell phone, which has a function for communicating with the user management server 130 or the like through a network such as the Internet or the like, for example.

The administrator terminal 120 is an example of a second terminal according to the present embodiment, and is a terminal apparatus employed by an administrator who administrates viewing and listening of contents by users. The administrator terminal 120 has a function for communicating with the user management server 130 through a network such as the Internet or the like. The administrator terminal 120 is the same as the user terminal 110 in that it is not asked whether the administrator terminal 120 is a portable terminal or fixed terminal, but unlike the user terminal 110, the administrator terminal 120 does not have to have a function for communicating a user ID with the display apparatus 140.

The user management server 130 is a user management server in the contents viewing and listening management system according to the present embodiment, or an example of the contents viewing and listening management apparatus according to the present embodiment, and manages information relating to users and administrators. The user management server 130 has a function for communicating with the user terminal 110, administrator terminal 120, and display apparatus 140 through a network such as the Internet or the like. An administrator list which includes, in response to a request for registration of information relating to an administrator (hereafter, referred to "administrator information") by the administrator terminal 120, the relevant administrator information is recorded in the user management server 130.

The display apparatus 140 is an example of a display apparatus according to the present embodiment, and is an apparatus having a function for displaying a predetermined content. Specifically, examples of the display apparatus 140 include a television receiver or the like which is capable of receiving analog broadcasting or digital broadcasting, and displaying this on a display or the like. The display apparatus 140 can be employed as electronic equipment making up a home network, and has a function for communicating with the user terminal 110, user management server 130, contents distribution server 160, payment server 170, and so forth through a network such as the Internet or the like. Note that the display apparatus 140 has an equipment ID for determining itself, and also has information relating to the place of the user management server 130 (e.g., IP address, URL, or the like).

The contents distribution server 160 is an example of a contents distribution server according to the present embodiment, and is an apparatus having a function for distributing contents to the display apparatus 140 through a network such as the Internet or the like. The contents distribution server 160 may perform distribution of a content in response to a request from the display apparatus 140 or the like, or may perform distribution of a content automatically regardless of a request from the display apparatus 140 or the like. Also, in a case wherein a content is a pay content, the contents distribution server 160 may perform distribution of the content after confirming that payment processing of the relevant content has been completed.

The payment server 170 is an example of a payment server according to the present embodiment, and in the case of a pay content, and is a device which performs payment processing as to purchase of the relevant content. The payment server 170 has a function for communicating with the user terminal 110, display apparatus 140, or the like though a network, and in response to a request from the user terminal 110, display apparatus 140, or the like, performs the payment processing as to the user terminal 110. Note that the payment server 170 does not necessarily have to be provided in all cases of pay content.

Description has been made so far regarding the overall configuration of the contents viewing and listening management system 1, and subsequently, description will be made in detail regarding a configuration of each apparatus making up the contents viewing and listening management system 1.

Functional Configuration of User Terminal 110

First, a configuration of the user terminal 110 will be described with reference to FIG. 2. Note that FIG. 2 is a block diagram illustrating a functional configuration of the first terminal according to the present embodiment.

Figure 2:
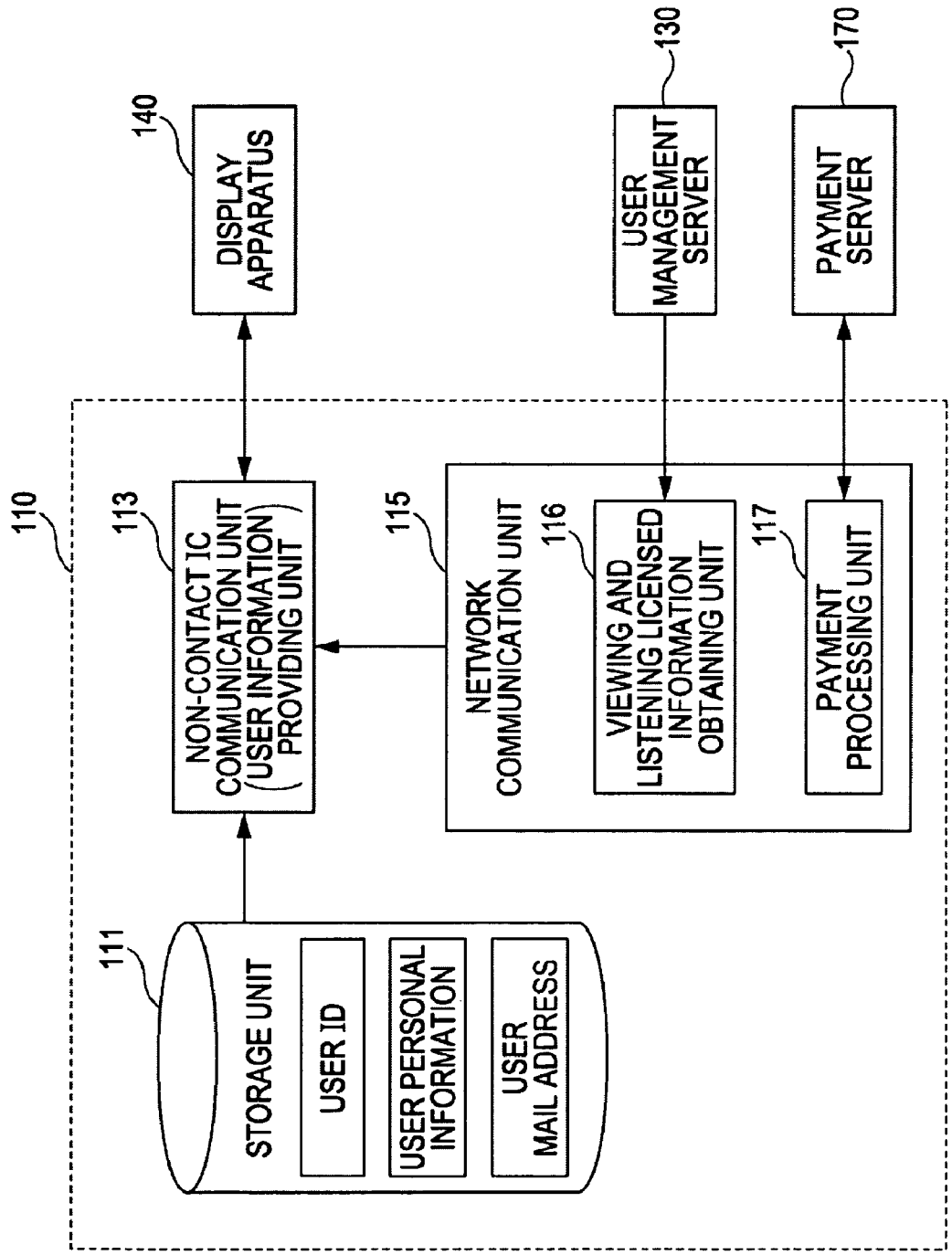
FIG. 2 is a block diagram illustrating a functional configuration of a first terminal according to the embodiment.

As shown in FIG. 2, the user terminal 110 principally includes a storage unit 111, non-contact IC communication unit 113, and network communication unit 115.

The storage unit 111 stores, for example, information such as a user ID (an ID for payment employed for payment at the time of purchase of a content) for identifying a user of the user terminal 110, user personal information (user name, age, and so forth), an e-mail address of the user terminal 110, and so forth.

The non-contact IC communication unit 113 is capable of transmission/reception of data with equipment having a non-contact IC communication function (display apparatus 140 in the present embodiment), which can be realized with an IC chip or the like implemented in a communication terminal such as a cell phone or the like, for example. With the present embodiment, the non-contact IC communication unit 113 extracts information such as a user ID stored in the storage unit 111, user personal information, e-mail address of the user terminal 110, or the like (hereafter, referred to as "user information" in some cases), and provides this to the display apparatus 140 (hereafter, in the case of clarifying the function of "non-contact IC communication unit 113", referred to as "user information providing unit 113"). In this case, the non-contact IC communication unit 113 can selectively select information to be provided to the display apparatus 140, and can provide various types of information to the display apparatus 140 as appropriate.

Unlike the non-contact IC communication function, the network communication unit 115 can transmit/receive data through a network such as the Internet or the like, and with the present embodiment, can communicate with the user management server 130 or payment server 170. Specifically, the network communication unit 115 includes a viewing and listening licensed information obtaining unit 116, payment processing unit 117, and so forth.

The viewing and listening licensed information obtaining unit 116 obtains viewing and listening licensed information relating to propriety of permission for viewing and listening by the relevant administrator as to a content to which viewing and listening restrict is set by an administrator (notice to the effect that viewing and listening is permitted, or notice to the effect that viewing and listening is not permitted) from the user management server 130. When obtaining the viewing and listening licensed information, the viewing and listening licensed information obtaining unit 116 can also obtain licensed content information for identifying a content of which the viewing and listening has been permitted by the administrator at the same time. Examples of the licensed content information include a content ID, content name, and so forth which identify the relevant content. Also, the viewing and listening licensed information obtaining unit 116 transmits the obtained viewing and listening licensed information and licensed content information to the non-contact IC communication unit 113. The non-contact IC communication unit 113 which received the viewing and listening licensed information and licensed content information transmits the relevant viewing and listening licensed information and licensed content information to the display apparatus 140, and also transmits a viewing and listening start request for a content identified with the relevant licensed content information to the display apparatus 140.

In the case of the payment server 170 receiving a request for the payment processing for purchasing of content from the display apparatus 140 or the like, the payment processing unit 117 performs the payment processing with the payment server 170.

Functional Configuration of Administrator Terminal 120

Next, a configuration of the administrator terminal 120 will be described with reference to FIG. 3. Note that FIG. 3 is a block diagram illustrating a functional configuration of the second terminal according to the present embodiment.

Figure 3:
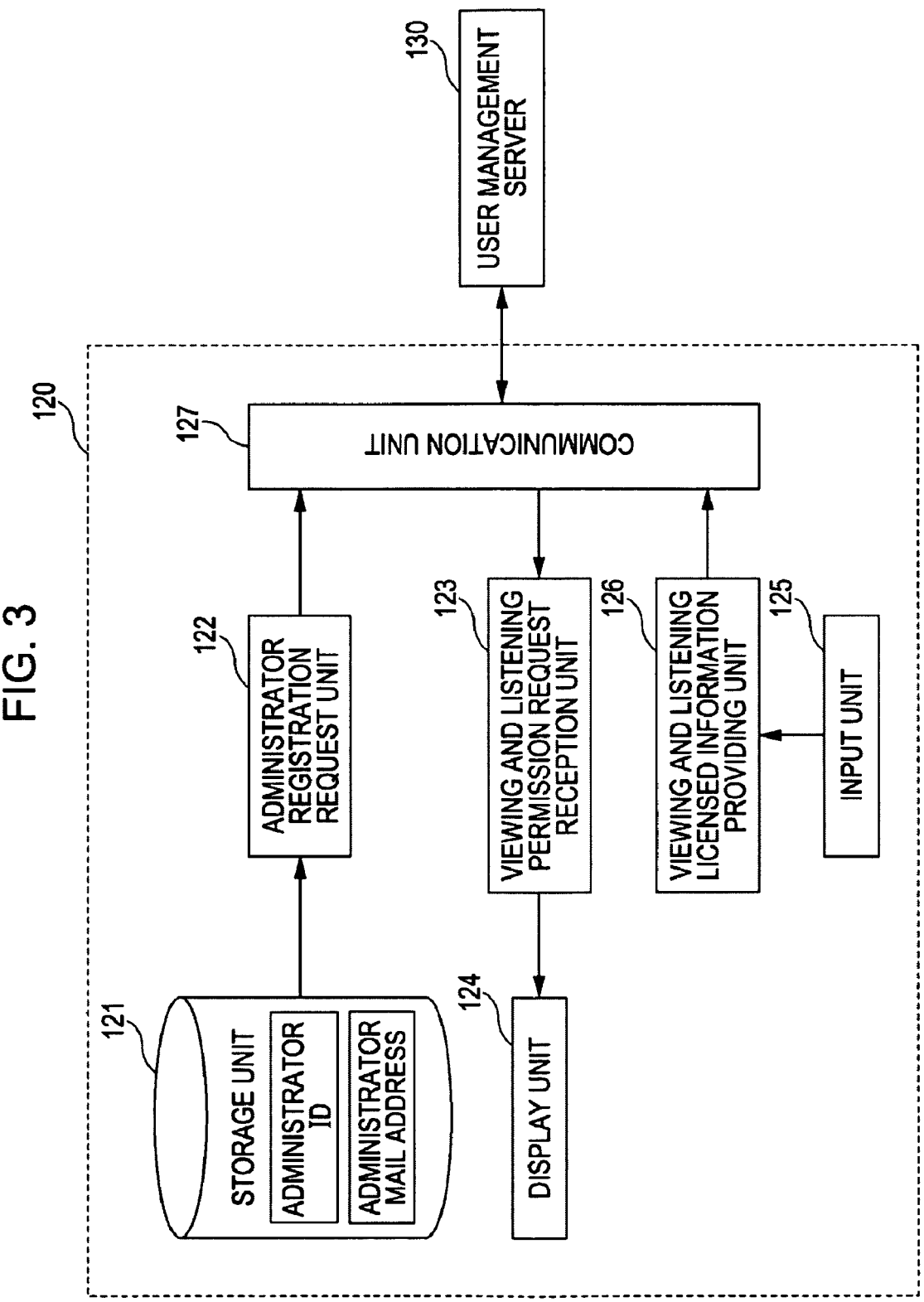
FIG. 3 is a block diagram illustrating a functional configuration of a second terminal according to the embodiment.

As shown in FIG. 3, the administrator terminal 120 principally includes a storage unit 121, administrator registration request unit 122, viewing and listening permission request reception unit 123, display unit 124, input unit 125, viewing and listening licensed information providing unit 126, and communication unit 127.

The storage unit 121 stores, for example, information such as an administrator ID for identifying an administrator who is a user of the administrator terminal 120, an e-mail address of the administrator terminal 120, and so forth.

The administrator registration request unit 122 extracts information such as an administrator ID stored in the storage unit 121, the e-mail address of the administrator terminal 120, and so forth (hereafter, referred to as "administrator information" in some cases), transmits this to the user management server 130 through the communication unit 127, and also transmits a registration request of the transmitted administrator information. Also, at this time, the administrator registration request unit 122 transmits a user ID of a user (e.g., person under age) managed by the administrator (e.g., person with parental authority) employing the administrator terminal 120, whereby the user managed by the relevant administrator can be registered in the user management server 130 beforehand.

In a case wherein a user requests viewing and listening of a predetermined content, and also in a case wherein the content thereof has not been permitted to be viewed and listened by the administrator, the viewing and listening permission request reception unit 123 receives a message for requesting permission for viewing and listening from the user management server 130. At this time, the viewing and listening permission request reception unit 123 receives information for identifying a content of which the viewing and listening has been requested, and information such as the name and user ID of the user who has requested the viewing and listening of the relevant content, price thereof in a case wherein the content is a pay content, a URL of a site for selecting whether or not viewing and listening is permitted, and so forth. The reception format of this message is not restricted to a particular form, but for example, this message can be received in an e-mail form by the administrator registration request unit 122 based on the e-mail address of the administrator terminal 120 stored in the user management server 130. The viewing and listening permission request reception unit 123 transmits the content of the received viewing and listening permission request to the display unit 124.

The display unit 124 displays the content of the viewing and listening permission request transmitted from the viewing and listening permission request reception unit 123 on a display of the administrator terminal 120 or the like. In response to the viewing and listening permission request displayed on the display or the like by the display unit 124, the administrator selects whether to permit the content of which the viewing and listening has been requested, and as a result thereof, i.e., viewing and listening licensed information relating to propriety of permission for viewing and listening is input to the administrator terminal 120 through the input unit 125. The input unit 125 transmits the input viewing and listening licensed information to the viewing and listening licensed information providing unit 126.

The viewing and listening licensed information providing unit 126 provides the viewing and listening licensed information transmitted from the input unit 125 to the user management server 130 through the communication unit 127. At this time, the viewing and listening licensed information providing unit 126 may transmit information for identifying a content corresponding to the relevant viewing and listening licensed information, the user ID of a user who requested the viewing and listening of the content thereof, and so forth.

The communication unit 127 performs overall transmission/reception of data with the user management server 130 through a network such as the Internet. Specifically, the communication unit 127 performs transmission of administrator information and so forth from the above-mentioned administrator registration request unit 122, reception of a viewing and listening permission request and so forth from the user management server 130, and transmission of viewing and listening licensed information and so forth from the viewing and listening licensed information providing unit 126.

Functional Configuration of User Management Server 130

Next, a functional configuration of the user management server 130 will be described with reference to FIG. 4. Note that FIG. 4 is a block diagram illustrating a functional configuration of the user management server (contents viewing and listening management apparatus) 130 according to the present embodiment.

Figure 4:
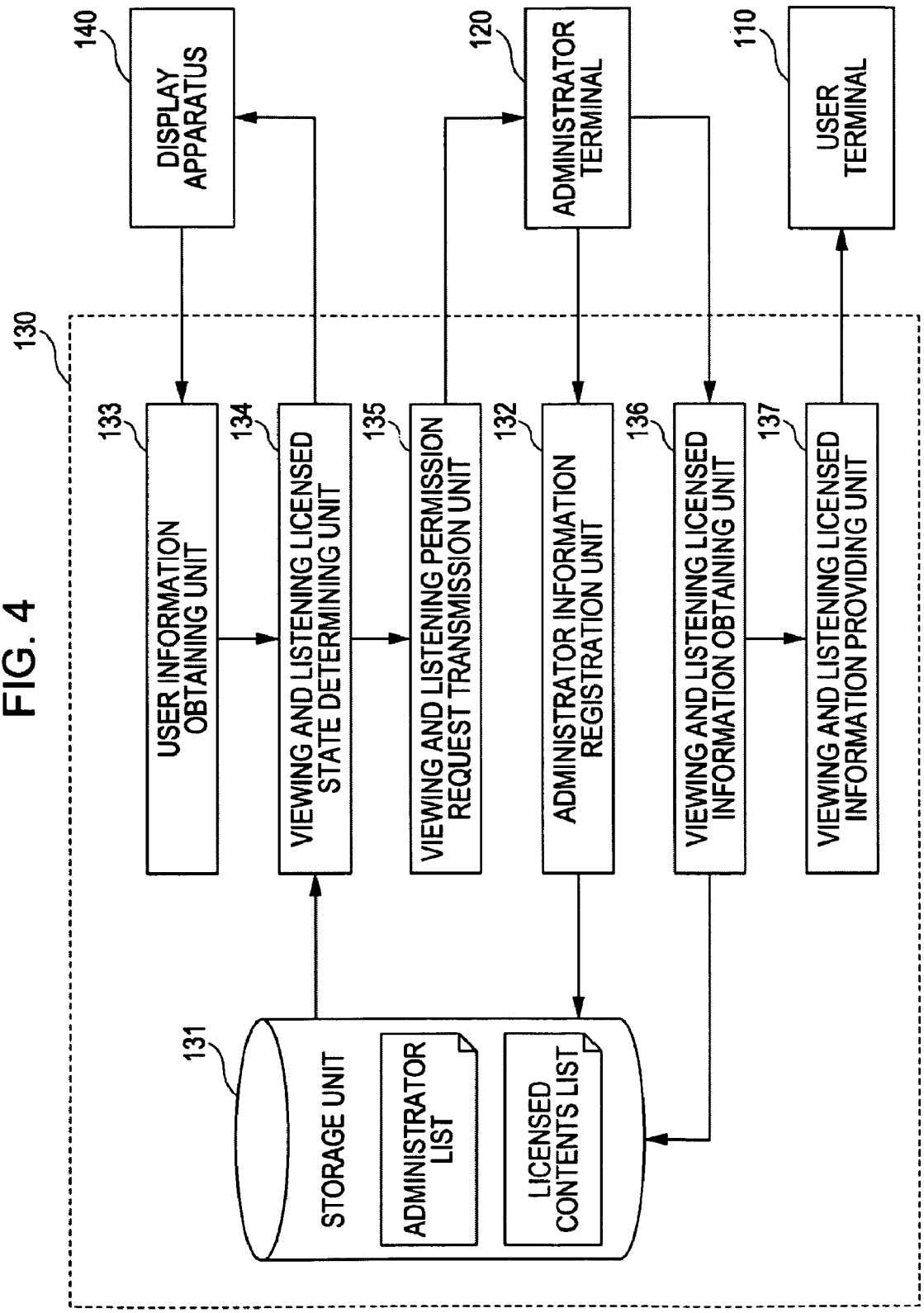
FIG. 4 is a block diagram illustrating a functional configuration of a user management server (contents viewing and listening management apparatus) according to the embodiment.

As shown in FIG. 4, the user management server 130 principally includes a storage unit 131, administrator information registration unit 132, user information obtaining unit 133, viewing and listening licensed state determining unit 134, viewing and listening permission request transmission unit 135, viewing and listening licensed information obtaining unit 136, and viewing and listening licensed information providing unit 137.

The storage unit 131 stores, for example, an administrator list and licensed contents list. Now, description will be made regarding the content of an administrator list and licensed contents list according to the present embodiment with reference to FIGS. 8A and 8B. Note that FIG. 8A is an explanatory diagram illustrating an example of an administrator list according to the present embodiment, and FIG. 8B is an explanatory diagram illustrating an example of a licensed contents list according to the present embodiment.

As shown in FIG. 8A, the administrator list according to the present embodiment is, for example, a list in which the e-mail address of the administrator terminal 120, and the user ID of a user managed by an administrator are recorded in a correlated manner with the administrator ID for identifying the administrator. Such information is included in the administrator list, whereby the user management server 130 can identify a registered administrator, the e-mail address of the administrator terminal 120 possessed by the administrator thereof, and a user to be managed by the administrator thereof. Also, the administrator list may include, for example, information relating to the names of the user and administrator corresponding to a user ID and administrator ID, the content of a content of which viewing and listening restriction regarding each of users to be managed is set (e.g., R-ratings, adult content), and so forth.

Also, as shown in FIG. 8B, the licensed contents list according to the present embodiment is, for example, a list in which the name of a user whose viewing and listening is restricted, the e-mail address of the user terminal 110 possessed by the relevant user, and information for identifying a content of which the viewing and listening is permitted as to each of users (content ID in FIG. 8B) are recorded in a correlated manner with the user ID of a user whose viewing and listening is restricted. The licensed contents list includes such information, whereby the user management server 130 can identify the name of each user, the e-mail address of the user terminal 110 possessed by each user, and a content of which the viewing and listening is permitted to each user. For example, it can be found that a content of which the content ID is "a000001", and a content of which the content ID is "b000001" of which the viewing and listening is permitted as to George Smith alone, but a content of which the content ID is "a010101" is permitted to be viewed and listened by both of George Smith and John Smith. Also, this licensed contents list may include information relating to the age of a user, an ID and name of an administrator who administrates the relevant user, the name of a content of which the viewing and listening is permitted, and so forth.

Description will be resumed regarding the functional configuration of the user management server 130 with reference to FIG. 4. In the case of receiving a request for registration of administrator information from the administrator registration request unit 122 of the administrator terminal 120, the administrator information registration unit 132 generates an administrator list (initial registration) based on the relevant administrator information (e.g., administrator ID, e-mail address of the administrator terminal 120, and so forth), and the user ID of a user managed by the relevant administrator, and so forth. Also, the administrator information registration unit 132 can also update the administrator list according to a request from the administrator terminal 120 even after initialization registration. Further, the administrator information registration unit 132 records the updated administrator list in the storage unit 131.

In a case wherein a viewing and listening request has been performed regarding a predetermined content by a user, and also in a case wherein in response to the viewing and listening request thereof, the display apparatus 140 determines that viewing and listening restriction is set to the relevant content, the user information obtaining unit 133 obtains user information including a user ID from the display apparatus 140. The user information obtained from the display apparatus 140 is information which the display apparatus 140 obtained from the user terminal 110. Usually, when the user information obtaining unit 133 obtains user information, at the same time the user information obtaining unit 133 receives an inquiry from the display apparatus 140, relating to whether or not a content of which the viewing and listening has been requested by a user is permitted by an administrator. Also, the user information which the user information obtaining unit 133 obtains at this time may include not only a user ID but also user personal information and the e-mail address of the user terminal 110 and so forth. However, in a case wherein user personal information and so forth are provided to the display apparatus 140 from the user terminal 110 once, it is desirable from the perspective of security that user personal information and so forth are not included at the time of obtaining of user information at the second time and thereafter. Also, the user information obtaining unit 133 obtains information for identifying a content according the inquiry from the display apparatus 140 at the same time as obtaining of user information. The user information obtaining unit 133 transmits information for identifying the obtained user information and content to the viewing and listening licensed state determining unit 134.

The viewing and listening licensed state determining unit 134 determines whether or not the content of which the viewing and listening has been requested by the user is permitted to be viewed and listened by the administrator based on the administrator list stored in the storage unit 131, and information for identifying the user information and content transmitted from the user information obtaining unit 133. As a determination result thereof, in the case of determining that the content is a content of which the viewing and listening has been permitted, the viewing and listening licensed state determining unit 134 informs the display apparatus 140 of that effect. On the other hand, in the case of determining that the content is not a content of which the viewing and listening has been permitted, the viewing and listening licensed state determining unit 134 informs the viewing and listening permission request transmission unit 135 of that effect.

In a case wherein the content of which the viewing and listening has been requested is a content of which the viewing and listening has not been permitted, i.e., in the case of being informed from the viewing and listening licensed state determining unit 134 that determination is made that the content of which the viewing and listening has been requested is a content of which the viewing and listening has not been permitted, the viewing and listening permission request transmission unit 135 transmits a message for requesting permission for viewing and listening of the content of which the viewing and listening has been requested to the administrator terminal 120. The transmission form of this message is not restricted to a particular form, but for example, this message can be transmitted in an e-mail format based on the e-mail address of the administrator terminal 120 included in the administrator list stored in the storage unit 131.

The viewing and listening licensed information obtaining unit 136 obtains viewing and listening licensed information relating to propriety of permission for viewing and listening by the administrator as to the content of which the viewing and listening has been requested, from the administrator terminal 120. Specifically, the viewing and listening licensed information obtaining unit 136 obtains the viewing and listening licensed information input through the input unit 125 of the administrator terminal 120. At this time, the viewing and listening licensed information obtaining unit 136 may receive information for identifying a content corresponding to the relevant viewing and listening licensed information, the user ID of the user who has requested the viewing and listening of the content thereof, and so forth. The viewing and listening licensed information obtaining unit 136 transmits the obtained viewing and listening licensed information, information for identifying a content corresponding to the relevant viewing and listening licensed information, the user ID of the user who has requested the viewing and listening of the content thereof, and so forth, to the viewing and listening licensed information providing unit 137. Also, in a case wherein the viewing and listening licensed information is to permit the viewing and listening of the content of which the viewing and listening has been requested, the viewing and listening licensed information obtaining unit 136 records the permitted content in the licensed contents list stored in the storage unit 131 in a correlated manner with the user ID of the permitted user.

The viewing and listening licensed information providing unit 137 provides the viewing and listening licensed information (notice to the effect that viewing and listening has been permitted, or notice to the effect that viewing and listening has not been permitted) transmitted from the viewing and listening licensed information obtaining unit 136, information for identifying a content corresponding to the relevant viewing and listening licensed information, the user ID of the user who has requested the viewing and listening of the content thereof, and so forth, to the user terminal 110.

Functional Configuration of Display Apparatus 140

Next, a functional configuration of the display apparatus 140 will be described with reference to FIG. 5. Note that FIG. 5 is a block diagram illustrating a functional configuration of the display apparatus 140 according to the present embodiment.

Figure 5:
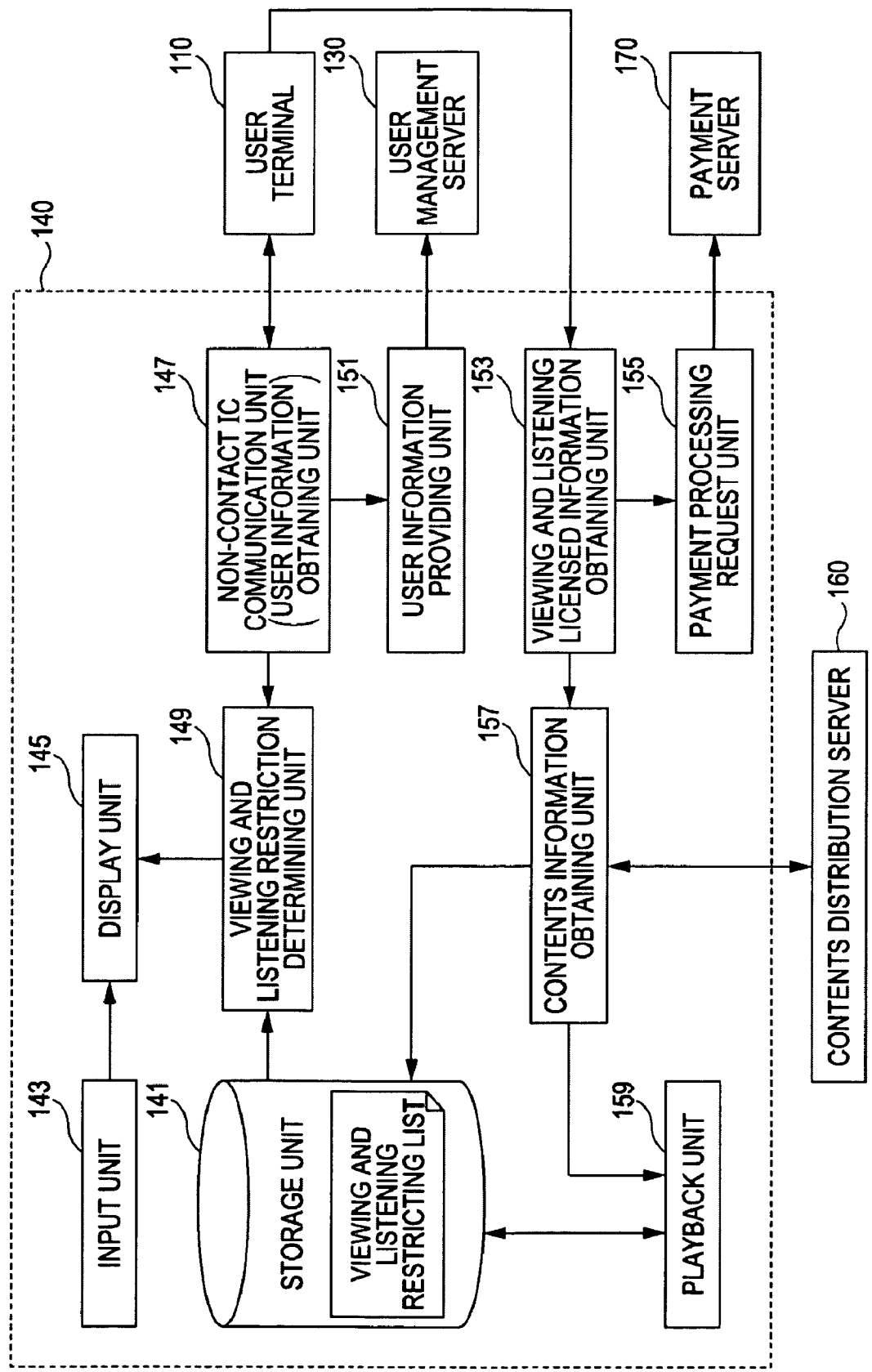
FIG. 5 is a block diagram illustrating a functional configuration of a display apparatus according to the embodiment.

As shown in FIG. 5, the display apparatus 140 principally includes a storage unit 141, input unit 143, display unit 145, non-contact IC communication unit 147, viewing and listening restriction determining unit 149, user information providing unit 151, viewing and listening licensed information obtaining unit 153, payment processing request unit 155, contents information obtaining unit 157, and playback unit 159.

The storage unit 141 stores, for example, a viewing and listening restricting list. Now, the content of a viewing and listening restricting list according to the present embodiment will be described with reference to FIG. 8C. Note that FIG. 8C is an explanatory diagram illustrating an example of a viewing and listening restricting list according to the present embodiment.

As shown in FIG. 8C, a viewing according to the present embodiment is, for example, a list in which the name of a user whose viewing and listening of a content managed by the administrator, the restriction content of a content (e.g., R-rating, adult content, or the like) of which the viewing and listening is restricted as to the relevant user are recorded in a correlated manner with the user ID of the relevant user. Such information is included in the viewing and listening restricting list, whereby the display apparatus 140 can identify a user whose viewing and listening of a content managed by the administrator, the name of the user thereof, and the restriction content of a viewing and listening content regarding the user thereof. For example, it can be found that restriction relating to viewing and listening is not applied in order of Charles Smith, George Smith, and John Smith. Note that this viewing and listening restricting list may include information such as a user's age, and so forth.

Description will be resumed regarding the functional configuration of the display apparatus 140 with reference to FIG. 5. Information relating a content which the user desires to view and listen is principally input to the input unit 143. Examples of the information input to the input unit 143 include a title of a content which the user desires to view and listen, and the ID of the relevant content. The input unit 143 transmits information of the input content to the display unit 145, and the display unit 145 displays that the relevant content has been selected (a viewing and listening request has been performed).

At this time, though not shown in the drawing, the display apparatus 140 may determine whether or not the authentication is needed for viewing and listening of the relevant content based on information (e.g., information such as information indicating adult content, R-rated content, pay content, or the like) included in meta data of a content (content selected by the user) input to the input unit 143. In this case, an arrangement may be made wherein the determination result is displayed on the display unit 145, thereby prompting the user to perform the subsequent operation (e.g., providing of user information, or the like).

The non-contact IC communication unit 147 is capable of transmission/reception of data only with the non-contact IC communication unit 113 of the user terminal 110. The non-contact IC communication unit 147 obtains information such as a user ID and so forth from the user terminal 110, for example, in a case wherein the content selected by the user is a content demanding authentication. The non-contact IC communication unit 147 transmits the obtained information such as a user ID and so forth to the viewing and listening restriction determining unit 149.

Here, in a case wherein the user ID obtained from the user terminal 110 is a user ID which is not included in the viewing and listening restricting list stored in the storage unit 141, the non-contact IC communication unit 147 may transmit a message for prompting the user management server 130 to register the user according to the relevant user ID as a user to be managed by the administrator. The user management server 130 which received this message transmits a message to the effect that there is a content viewing and listening request from an unregistered user, and a message for prompting the administrator terminal 120 to add the relevant user to the administrator list, to the administrator terminal 120.

In response to input to the input unit 143 regarding a predetermined content, i.e., a viewing and listening request regarding a predetermined content, the viewing and listening restriction determining unit 149 determines whether or not viewing and listening restriction of a content according to the relevant viewing and listening request is set based on information included in the meta data of the content obtained by the contents information obtaining unit 157, the user ID transmitted from the non-contact IC communication unit 147, and the viewing and listening restricting list stored in the storage unit 141. For example, with the example shown in FIG. 8C, let us consider a case wherein information such as "Rated R-18" is included in the meta data of the content obtained by the contents information obtaining unit 157, and the user ID transmitted from the non-contact IC communication unit 147 is "0361". In this case, upon referencing the viewing and listening restricting list, George Smith whose user ID is "0361" is stipulated with restriction content such as "R15 or higher needs restriction", and accordingly, a content of "Rated R-18" is determined as viewing and listening restriction having been set to George Smith. The viewing and listening restriction determining unit 149 displays the determination result on the display unit 145, and also in a case wherein the content according to the viewing and listening request is a content of which the viewing and listening restriction is set, displays a message to the effect that the administrator's permission is necessary for viewing and listening of the relevant content, and a message for prompting providing of user personal information and so forth, on the display unit 145.

According to the behavior of the user viewed this display, communication between the non-contact IC communication unit 147 and user terminal 110 is performed, and the non-contact IC communication unit 147 obtains user information including user personal information and so forth. The non-contact IC communication unit 147 transmits the obtained user information to the user information providing unit 151.

In the case of determining that viewing and listening restriction is set to a content according to the viewing and listening request by the viewing and listening restriction determining unit 149, the user information providing unit 151 provides user information including the user ID and user personal information transmitted from the non-contact IC communication unit 147, to the user management server 130. Usually, when the user information providing unit 151 providing user information, at the same time the user information providing unit 151 transmits an inquiry regarding whether or not the content of which the viewing and listening has been requested by the user is permitted by the administrator, to the user management server 130. Also, the user information which the user information providing unit 151 provides at this time may include not only the user ID but also user personal information, the e-mail address of the user terminal 110, and so forth. However, in a case wherein user personal information and so forth are provided to the display apparatus 140 from the user terminal 110 once, it is desirable from the perspective of security that user personal information and so forth are not included at the time of providing of user information at the second time and thereafter. Also, the user information providing unit 151 provides information for identifying a content according the inquiry to the user management server 130 at the same time as providing of user information.

The viewing and listening licensed information obtaining unit 153 obtains the viewing and listening licensed information and licensed content information from the user terminal 110 or user management server 130. With the example shown in FIG. 5, an arrangement is made wherein the viewing and listening licensed information obtaining unit 153 obtains the viewing and listening licensed information and licensed content information from the user terminal 110. In a case wherein the content of the viewing and listening licensed information means permission for viewing and listening, the viewing and listening licensed information obtaining unit 153 obtains the relevant viewing and listening licensed information and licensed content information from the user terminal 110, and also receives a viewing and listening start request of a content identified with the relevant licensed content information from the user terminal 110. The viewing and listening licensed information obtaining unit 153 transmits the obtained viewing and listening licensed information (restricted to the case wherein the content of the viewing and listening licensed information means permission for viewing and listening), licensed content information, and a viewing and listening start request of a content identified with the relevant licensed content information, to the payment processing request unit 155 and contents information obtaining unit 157.

In the case of receiving the viewing and listening licensed information (restricted to the case wherein the content of the viewing and listening licensed information means permission for viewing and listening), licensed content information, and a viewing and listening start request of a content identified with the relevant licensed content information, from the viewing and listening licensed information obtaining unit 153, the payment processing request unit 155 transmits a request to the effect that the payment processing is performed with the user terminal 110, to the payment server 170. At this time, the payment processing request unit 155 transmits the licensed content information to the payment server 170.

In the case of receiving the viewing and listening licensed information (restricted to the case wherein the content of the viewing and listening licensed information means permission for viewing and listening), licensed content information, and a viewing and listening start request of a content identified with the relevant licensed content information, from the viewing and listening licensed information obtaining unit 153, the contents information obtaining unit 157 requests distribution of a content according to the relevant viewing and listening request as to the contents distribution server 160. Also, in response to this request, the contents information obtaining unit 157 obtains the content distributed from the contents distribution server 160, and content meta data accompanied therewith. Note that the contents information obtaining unit 157 can obtain only the meta data beforehand. Also, the contents information obtaining unit 157 may request distribution of a content after waiting for the payment processing between the user terminal 110 and payment server 170. The contents information obtaining unit 157 transmits the obtained content to the playback unit 159.

The playback unit 159 plays the content transmitted from the contents information obtaining unit 157.

Functional Configuration of Contents Distribution Server 160

Figure 6:
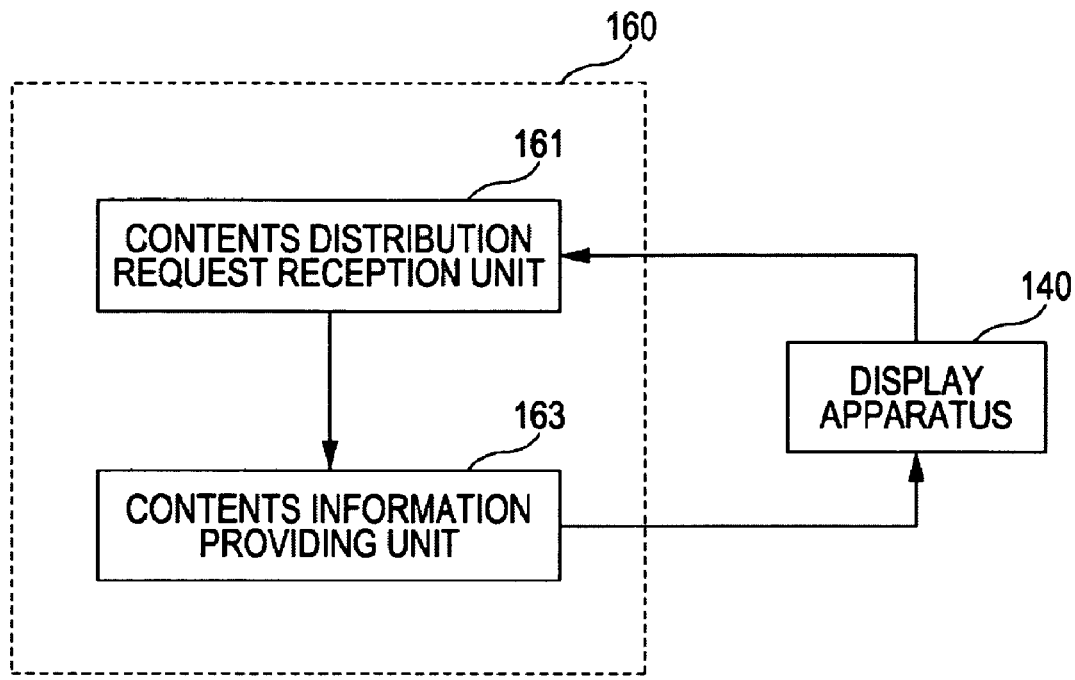
FIG. 6 is a block diagram illustrating a functional configuration of a contents distribution server according to the embodiment.

Next, a functional configuration of the contents distribution server 160 will be described with reference to FIG. 6. Note that FIG. 6 is a block diagram illustrating a functional configuration of the contents distribution server 160 according to the present embodiment. As shown in FIG. 6, the contents distribution server 160 principally includes a contents distribution request reception unit 161, and contents information providing unit 163.

The contents distribution request reception unit 161 receives the viewing and listening licensed information (restricted to the case wherein the content of the viewing and listening licensed information means permission for viewing and listening), licensed content information, and a viewing and listening start request of a content identified with the relevant licensed content information, from the display apparatus 140. The contents distribution request reception unit 161 transmits the received viewing and listening licensed information (restricted to the case wherein the content of the viewing and listening licensed information means permission for viewing and listening), and licensed content information to the contents information providing unit together with instructions for content distribution.

The contents information providing unit 163 extracts a content relating to a request from the user terminal 110 out of contents stored in a storage unit (not shown) based on the viewing and listening licensed information (restricted to the case wherein the content of the viewing and listening licensed information means permission for viewing and listening) and licensed content information transmitted from the contents distribution request reception unit 161, and distributes the extracted content to the display apparatus 140.

Functional Configuration of Payment Server 170

Next, a functional configuration of the payment server 170 will be described with reference to FIG. 7. Note that FIG. 7 is a block diagram illustrating a functional configuration of the payment server 170 according to the present embodiment.

Figure 7:
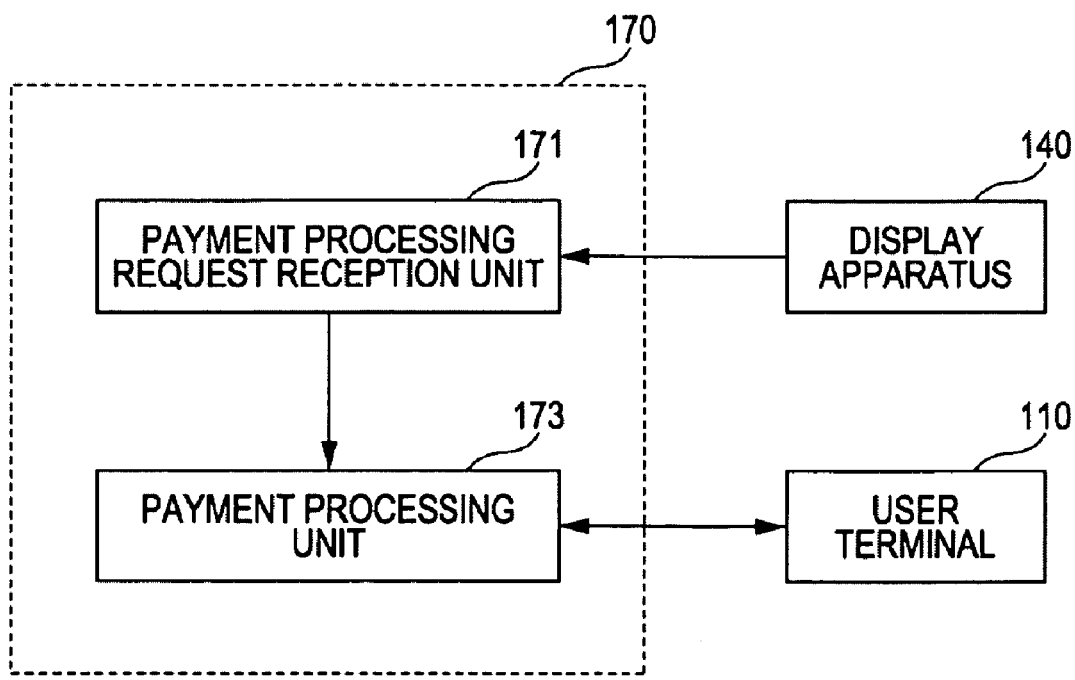
FIG. 7 is a block diagram illustrating a functional configuration of a payment server according to the embodiment.

As shown in FIG. 7, the payment server 170 principally includes a payment processing request reception unit 171, and payment processing unit 173.

The payment processing request reception unit 171 receives a request for the payment processing from the display apparatus 140 in response to a content viewing and listening request from the user terminal 110. At this time, the payment processing request reception unit 171 receives the licensed content information. The payment processing request reception unit 171 transmits the received licensed content information to the payment processing unit 173 together with instructions for the payment processing.

In response to the instructions for the payment processing from the payment processing request reception unit 171, the payment processing unit 173 performs the payment processing with the user terminal 110. At this time, the payment processing unit 173 identifies a content serving as a target for the payment processing based on the licensed content information received from the payment processing request reception unit 171.

Hardware Configuration of Each Apparatus Configuring Content Viewing and Listening Management System 1

An example of the function of each apparatus making up the contents viewing and listening management system according to the present embodiment has been shown so far. Each of the above-mentioned components may be configured with a general-purpose member or circuit, or may be configured of hardware specialized for the function of each component. Also, the function of each component may be realized with the CPU or the like. Accordingly, an employed configuration may be changed according to a technology level at the time of implementing the present embodiment as appropriate. Description will be made below regarding an example of a hardware configuration for realizing the function of each apparatus making up the above-mentioned contents viewing and listening management system according to the present embodiment.

First, description will be made regarding hardware configurations of the user terminal 11 and display apparatus 140 according to the present embodiment having a non-contact IC communication function, based on FIG. 9. Note that FIG. 9 is a block diagram illustrating a hardware configuration of the first terminal (or display apparatus) according to the present embodiment. Description will be made below by exemplifying the display apparatus 140.

The display apparatus 140 principally includes a CPU (Central Processing Unit) 801, ROM (Read Only Memory) 803, RAM (Random Access Memory) 805, host bus 807, bridge 809, external bus 811, interface 813, input apparatus 815, output apparatus 817, storage apparatus 819, non-contact IC communication apparatus 821, and communication apparatus 823.

The CPU 801 serves as a calculation processing apparatus and control apparatus, and controls part or overall of operation within the display apparatus 140 in accordance with various types of programs recorded in the ROM 803, RAM 805, or storage apparatus 819. The ROM 803 stores a program employed by the CPU 801, calculation parameters, and so forth. The RAM 805 temporarily stores a program employed for execution of the CPU 801, parameters which will be changed with execution thereof as appropriate, and so forth. These are mutually connected by a host bus 807 made up of an internal bus such as a CPU bus or the like.

The host bus 807 is connected to an external bus 811 such as a PCI (Peripheral Component Interconnect/Interface) bus or the like through the bridge 809.

The input apparatus 815 is operating means operated by the user, for example, such as a mouse, keyboard, touch panel, buttons, switches, levers, and so forth. Also, the input apparatus 815 is configured of, for example, an input control circuit or the like, which generates an input signal based on information input by the user by employing the above-mentioned operating means, and outputs this to the CPU 801. The user of the display apparatus 140 operates the input apparatus 815, thereby enabling various types of data to be input to the display apparatus 140, or instructing processing operation.

The output apparatus 817 is configured of an apparatus capable of informing a user of obtained information visually or aurally, for example, such as a display apparatus such as a CRT display apparatus, liquid crystal display apparatus, plasma display apparatus, EL display apparatus, lamp, or the like, audio output apparatus such as a speaker, headphone, or the like. Specifically, the display apparatus displays various types of information such as image data or the like by using text or an image. On the other hand, the audio output apparatus converts audio data or the like into audio, and output this.

The storage apparatus 819 is an apparatus for data storage configured as an example of a storage unit of the display apparatus 140 according to the present embodiment, and is configured of, for example, a magnetic storage unit device such as an HDD (Hard Disk Drive) or the like, semiconductor storage device, optical storage device, magneto-optical storage device, or the like. The storage apparatus 819 stores a program which the CPU 801 executes, various types of data, image signal data obtained externally, and so forth.

The non-contact IC communication apparatus 821 is a reader/writer capable of transmission/reception of data as to non-contact IC communication equipment 825 having a non-contact IC communication function, and is built in or externally attached to the display apparatus 140. The non-contact IC communication apparatus 821 reads out information recorded in the non-contact IC communication equipment 825 to output this to the RAM 805. Also, the non-contact IC communication apparatus 821 can write records in the non-contact IC communication equipment 825. An IC card (Integrated Circuit card) on which a non-contact-type IC chip is mounted, or electronic equipment such as a cell phone or the like may be employed as the non-contact IC communication equipment 825, for example.

The communication apparatus 823 is, for example, a communication interface made up of a communication device or the like for connecting to a communication network 5. The communication apparatus 823 is, for example, a communication card for cable or wireless LAN (Local Area Network), Bluetooth, or WUSB (Wireless USB), or router for optical communication, router for ADSL (Asymmetric Digital Subscriber Line), modem for various types of communication, or the like. The communication apparatus 823 for example can transmit/receive contents or various types of information with the Internet or another communication equipment. Also, the communication network 5 to be connected to the communication apparatus 823 is configured of a network or the like connected by cable or wireless, and may be, for example, the Internet, home LAN, infrared communication, satellite communication, or the like.

Next, description will be made regarding a hardware configuration of the administrator terminal 120, user management server 130, contents distribution server 160, and payment server 170 according to the present embodiment, which do not have a non-contact IC communication function, with reference to FIG. 10. Note that FIG. 10 is a block diagram illustrating a hardware configuration of the second terminal (user management server, contents distribution server, or payment server) according to the present embodiment. Description will be made below exemplifying the user management server 130.

The user management server 130 principally includes a CPU (Central Processing Unit) 901, ROM (Read Only Memory) 903, RAM (Random Access Memory) 905, host bus 907, bridge 909, external bus 911, interface 913, input apparatus 915, output apparatus 917, storage apparatus 919, drive 921, connection port 923, and communication apparatus 925.

The CPU 901 serves as a calculation-processing apparatus and control apparatus, and controls part or overall operation within the user management server 130 in accordance with various types of program recorded in the ROM 903, RAM 905, storage apparatus 919, or removable recording medium 927. The ROM 903 stores a program which the CPU 901 employs, calculation parameters, and so forth. The RAM 905 temporarily stores a program employed for execution of the CPU 901, parameters which vary as appropriate with execution thereof, and so forth. These are mutually connected by the host bus 907 made up of an internal bus such as a CPU bus or the like.

The host bus 907 is connected to the external bus 911 such as a PCI (Peripheral Component Interconnect/Interface) bus or the like through the bridge 909.

The input apparatus 915 is operating means operated by the user, for example, such as a mouse, keyboard, touch panel, buttons, switches, levers, and so forth. Also, the input apparatus 915 may be, for example, remote control means (so-called remote control) employing infrared light, other radio wave, or may be external connection equipment 929 such as a cell phone, PDA, or the like corresponding to operations of the user management server 130. Further, the input apparatus 915 is configured of, for example, an input control circuit or the like, which generates an input signal based on information input by the user by employing the above-mentioned operating means, and outputs this to the CPU 901.

The output apparatus 917 is configured of an apparatus capable of informing a user of obtained information visually or aurally, for example, such as a display apparatus such as a CRT display apparatus, liquid crystal display apparatus, plasma display apparatus, EL display apparatus, lamp, or the like, audio output apparatus such as a speaker, headphone, or the like, printer apparatus, cell phone, facsimile, or the like. Specifically, the display apparatus displays various types of information such as image data or the like by using text or an image. On the other hand, the audio output apparatus converts audio data or the like into audio, and output this.

The storage apparatus 919 is an apparatus for data storage configured as an example of a storage unit of the user management server 130 according to the present embodiment, and is configured of, for example, a magnetic storage unit device such as an HDD (Hard Disk Drive) or the like, semiconductor storage device, optical storage device, magneto-optical storage device, or the like. The storage apparatus 919 stores a program which the CPU 901 executes, various types of data, image signal data obtained externally, and so forth.

The drive 921 is a reader/writer for recording media, and is built in or externally attached to the user management server 130. The drive 921 reads out information recorded in the removable recording medium 927 such as a mounted magnetic disk, optical disc, magneto-optical disk, semiconductor memory, or the like, and outputs this to the RAM 905. Also, the drive 921 can write records in the removable recording medium 927 such as a mounted magnetic disk, optical disc, magneto-optical disk, semiconductor memory, or the like. Examples of the removable recording medium 927 include a DVD medium, HD-DVD medium, Blu-ray medium, CompactFlash (CF) (registered trademark), memory stick, and SD memory card (Secure Digital memory card) or the like. Also, the removable recording medium 927 may be, for example, an IC card (Integrated Circuit card) on which a non-contact-type IC chip is mounted, electronic equipment, or the like.

The connection port 923 is a port for directly connecting equipment to the user management server 130, for example, such as a USB (Universal Serial Bus) port, IEEE 1394 port such as i.Link or the like, SCSI (Small Computer System Interface) port, RS-232C port, optical audio terminal, or the like. External connection equipment 929 is connected to the connection port 923, whereby the user management server 130 obtains information directly from the external connection equipment 929, or provides information to the external connection equipment 929.

The communication apparatus 925 is, for example, a communication interface made up of a communication device or the like for connecting to the communication network 5. The communication apparatus 925 is, for example, a communication card for cable or wireless LAN (Local Area Network), Bluetooth, or WUSB (Wireless USB), or router for optical communication, router for ADSL (Asymmetric Digital Subscriber Line), modem for various types of communication, or the like. The communication apparatus 925 can transmit/receive image signals and the like with the Internet or other communication equipment. Also, the communication network 5 to be connected to the communication apparatus 925 is configured of a network or the like connected by cable or wireless, and may be, for example, the Internet, home LAN, infrared communication, satellite communication, or the like.

An example of the hardware configurations capable of realizing functions of the image display apparatus and identification information reading apparatus according to the present embodiment have been shown so far. Each of the above-mentioned components may be configured with a general-purpose member, or may be configured of hardware specialized for the function of each component. Accordingly, an employed hardware configuration may be changed according to a technology level at the time of implementing the present embodiment as appropriate.

Processing Flow of Contents Viewing and Listening Management System 1

Description has been made so far in detail regarding the functional configuration of each apparatus making up the contents viewing and listening management system 1, and the hardware configuration for realizing the function thereof, and subsequently, description will be made in detail regarding a processing flow of the contents viewing and listening management system 1 according to the present embodiment with reference to FIGS. 11 through 13. Note that FIG. 11 is an explanatory diagram illustrating a processing flow of the contents viewing and listening management system 1, and FIGS. 12 and 13 are explanatory diagrams illustrating a GUI example with each processing exemplified in FIG. 11.

With the following description, as shown in (a) in FIG. 12, there is exemplified a case wherein a son (George Smith) attempts to view and listen a pay content of VOD (Video On Demand) using the display apparatus 140 having a home non-contact IC communication function (e.g., a digital television compatible with Felica (registered trademark), or the like).

Also, before starting the processing shown in FIG. 11, as the premise thereof, let us say that with the user management server 130, in response to a request from the administrator terminal 120, registration of administrator information and generation of an administrator list have been performed, and a parent has been registered as an administrator of the son.

First, as shown in FIG. 11, the son who is a user of the user terminal 110 selects a desired content to be viewed and listened on the display screen of the display apparatus 140 through the input unit 143 (S11). Specifically, for example, as shown in (b) in FIG. 12, the son selects movie B from a VOD menu displayed on the display screen of the display apparatus 140 as a desired content to be viewed and listened.

Next, the display unit 145 of the display apparatus 140 displays that detailed information of the content selected on the display screen, and authentication are needed (S13). The display apparatus 140 determines whether or not authentication is needed based on information included in the meta data of the selected content, and in the case of determining that authentication is needed, displays that authentication is needed. Specifically, as shown in (c) in FIG. 12, the details of the content, and for example, an alert to the effect that "Authentication is needed. Please hold a wallet cell phone (110) up over the reader/writer (140A)." are displayed on the display screen of the display apparatus 140.

Next, in response to the alert on the display screen, for example, upon the son holding a wallet cell phone which is the user terminal 110 up over the reader/writer 140A of the display apparatus 140, the non-contact IC communication unit 113 of the user terminal 110 transmits a user ID, e.g., an ID for payment or the like at the time of purchase of the content to the display apparatus 140 (S15).

Next, the display apparatus 140 collates the ID for payment obtained from the user terminal 110 with a user ID (ID for payment) included in the viewing and listening restricting list stored in the storage unit 141. As a result thereof, in a case wherein there is a matched ID for payment, the display apparatus 140 compares restriction content set as to the user of the ID thereof (e.g., "Rated R-15 needs restriction", or the like), and the content included in the meta data of the content selected by the user (e.g., "Rated R-18", or the like), and determines whether or not the content selected by the user (here, movie B) is a content of which viewing and listening restriction is set (S17). As a result of this determination, in a case wherein determination is made that viewing and listening restriction is set, the display apparatus 140 requests distribution of the content selected by the user (movie B) as to the contents distribution server 160 (S19).

On the other hand, as a determination result in step S17, in a case wherein determination is made that viewing and listening restriction is set to the content selected by the user, the display apparatus 140 requests personal information (name, age, e-mail address of the user terminal 110, and so forth) of the relevant user (son) as to the user terminal 110 (S21). Specifically, for example, as shown in (d) in FIG. 12, the display unit 145 displays a message to the effect that "In the case of viewing and listening the selected content, the administrator (parent)'s permission is needed." on the display screen of the display apparatus 140, as the results of determination at the viewing and listening restriction determining unit 149. Further, as shown in (e) in FIG. 12, in order to transmit a confirmation mail of permission for viewing and listening to the administrator (parent), the display unit 145 displays an alert on the display screen so as to hold the wallet cell phone (110) up over the reader/writer (140A) again as a message for prompting input of the personal information of the user (son) to transmit a confirmation mail to the administrator (parent).

Next, in response to the alert on the display screen, for example, upon the user holding the wallet cell phone which is the user terminal 110 up over the reader/writer 140A of the display apparatus 140, the non-contact IC communication unit 113 of the user terminal 110 transmits the personal information of the user on the display apparatus 140 (S23).

Further, the display apparatus 140 which obtained the user personal information inquires for whether or not use permission has been made by the administrator regarding the content selected by the user, as to the user management server 130 (S25). At this time, the display apparatus 140 transmits user information including the user ID and user personal information, information for identifying the content selected by the user, and the meta data of the content, to the user management server 130.

The user management server 130 which received the inquiry in step S25 from the display apparatus 140 determines whether or not the inquired content is permitted to viewed and listened by the administrator based on the user information including the user ID and user personal information obtained from the display apparatus, information for identifying the content selected by the user, the meta data of the content, and so forth, and the licensed contents list stored in the storage unit 131 (S27).

As a result of this determination, in the case of determining that permission for viewing and listening is permitted, the user management server 130 informs the user terminal 110 that the viewing and listening of the selected content is permitted by the administrator (S29). As a form of the notice in step S29, for example, a form of mail transmission to the user terminal 110 from the user management server 130 can be employed. In this case, with the user management server 130, the e-mail address of the user terminal 110 needs to have been transmitted from the display apparatus 140.

On the other hand, in the case of determining that viewing and listening is not permitted as a result of the determination in step S27, the user management server 130 transmits a viewing and listening permission request regarding the content selected by the user to the administrator terminal 120 (S31). In this step S31, in addition to the viewing and listening permission request, information relating to the content which the user attempts to view and listen, or purchase (e.g., content title, content price, adult content, content with R-rating, and so forth), and URL indicating a place in which whether to permit viewing and listening, or purchase is registered, and so forth are transmitted from the user management server 130 to the administrator terminal 120. With the processing in step S31, as shown in (f) in FIG. 12, a form of mail transmission to the administrator terminal 120 from the user management server 130 can be employed, for example. In this case, the user management server 130 transmits a mail based on the e-mail address of the administrator terminal 120 included in the administrator list registered beforehand.

Note that, usually, it can be conceived as a rare case that the user purchases the content again, which has been permitted by the administrator once, so an arrangement may be made wherein upon the user holding the wallet cell phone which is the user terminal 110 up over the reader/writer 140A of the display apparatus 140, the processing in steps S23, S25, and S31 is performed automatically without performing the determination in step S27. That is to say, upon the user holding the user terminal 110 up over the reader/writer 140A, a viewing and listening permission request message may be transmitted to the administrator terminal 120 automatically.

Thus, upon the administrator terminal 120 receiving a viewing and listening permission request message from the user management server 130, for example, as shown in (a) in FIG. 13, a message in which the content of a content of which the viewing and listening is requested, price of the content thereof, and URL of a page for selecting whether to permit are described is displayed on the display screen of the administrator terminal 120. The administrator who viewed this message operates the input unit 125 of the administrator terminal 120, thereby making the transition to a page for selecting whether to permit, and transmitting the result thereof based on the displayed URL. For example, as shown in (b) in FIG. 13, the user ID, name, choice (Yes or No) regarding whether to permit, a transmission button, and so forth are displayed on the page after the transition.

Upon the administrator operating the input unit 125 to select either "Yes" or "No" ("Yes" is selected in the example in FIG. 13), and press the transmission button on the page after the transition, an reply of propriety of permission for viewing and listening by the administrator is transmitted to the user management server 130 from the administrator terminal 120 (S33).

Upon receiving the reply of propriety of permission for viewing and listening from the administrator terminal 120, the user management server 130 determines whether or not the user can view and listen to (or purchase) the content which the relevant user attempts to view and listen (or purchase), based on the content of the reply thereof (S35). As a result thereof, in a case wherein the reply from the administrator terminal 120 is "Yes", i.e., in the case of determining that the content can be viewed and listened, the user management server 130 informs the user terminal 110 of that the viewing and listening of the selected content has been permitted by the administrator (S37). With regard to this notice, for example, as shown in (c) in FIG. 13, a form of mail transmission to the user terminal 110 from the user management server 130 can be employed.

Thus, upon receiving the reply message of propriety of permission for viewing and listening of the selected content from the user management server 130, the user terminal 110 displays, for example, as shown in (d) in FIG. 13, a title of the content which the user attempts to view and listen, price of the content thereof, the reply result of propriety of permission for viewing and listening of the content thereof (that permission has been made in the present example), and an alert to the effect that there is a need to hold the wallet cell phone (110) up over the reader/writer (140A) to start viewing and listening of the content, on the display screen of the user terminal 110.

At this time, in a case wherein there are multiple contents of which the viewing and listening has already been permitted as to the same user, for example, a menu in a list form whereby the user can select out of the multiple permitted contents may be displayed on the display screen of the user terminal 110.

Next, in response to the alert on the display screen, for example, upon the user holding the wallet cell phone which is the user terminal 110 up over the reader/writer 140A of the display apparatus 140, the non-contact IC communication unit 113 of the user terminal 110 transmits a content viewing and listening (or purchase) request to the display apparatus 140 (S39).

Upon receiving the viewing and listening request from the user terminal 110, the display apparatus 140 transmits a request to the effect that the payment processing as to purchase of the content of which the viewing and listening has been permitted is performed with the user terminal 110, to the payment server 170 (S41), and at the same time requests distribution of the content of which the viewing and listening has been permitted, as to the contents distribution server 160 (S43). Upon receiving a payment processing request from the display apparatus 140, the payment server 170 performs the payment processing with the user terminal 110 (S45). Also, upon receiving a distribution request for the content of which the viewing and listening has been permitted from the display apparatus 140, the contents distribution server 160 distributes the relevant content to the display apparatus 140 (S47). After or while receiving the content of which the viewing and listening has been permitted from the contents distribution server 160, as shown in (e) in FIG. 13, the display apparatus 140 plays the content thereof.

Note that, with the present embodiment, the case has been shown wherein the payment processing in step S45 and content distribution request in step S47 are performed simultaneously, but an arrangement may be made wherein confirmation is made that the payment has been completed by waiting for the payment processing in step S45, and then the content distribution request in step S47 is performed.

As a result of the determination in step S35, in a case wherein the reply from the administrator terminal 120 is "No", i.e., in the case of determining that the viewing and listening of the content should not be performed, the user management server 130 informs the user terminal 110 that the viewing and listening of the selected content has not been permitted by the administrator (S49). With regard to this notice, as shown in (c) in FIG. 13 for example, a form of mail transmission to the user terminal 110 from the user management server 130 can be employed.

Processing Flow of Contents Viewing and Listening Management Method According to Present Embodiment Next, description will be made regarding a processing flow of a contents viewing and listening management method in the contents viewing and listening management apparatus (user management server) 130 according to the present embodiment, with reference to FIG. 14. Note that FIG. 14 is a flowchart illustrating a processing flow of the contents viewing and listening management method in the contents viewing and listening management apparatus (user management server) 130 according to the present embodiment.

Figure 14:
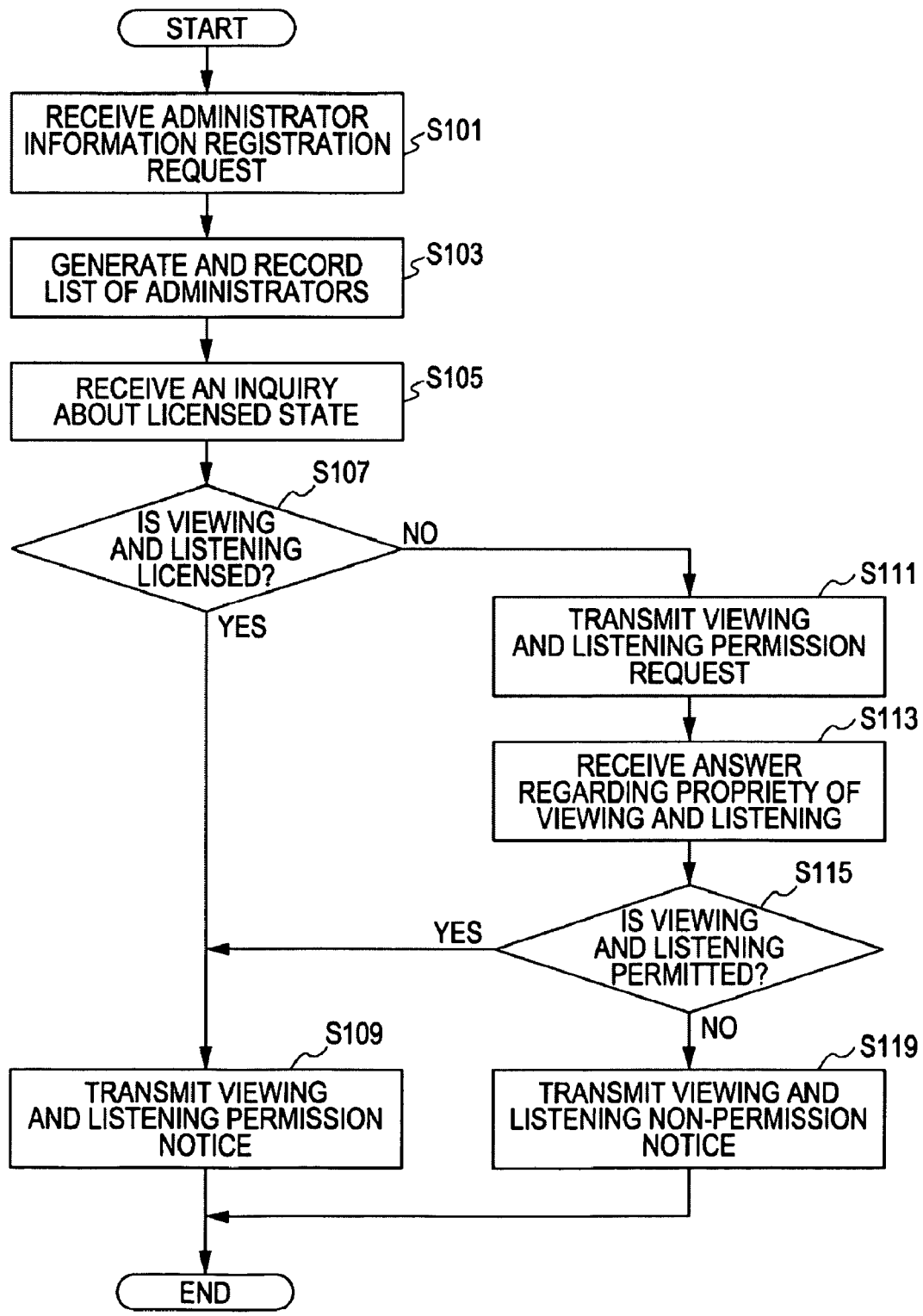
FIG. 14 is a flowchart illustrating a processing flow of a contents viewing and listening management method according to the embodiment.

As shown in FIG. 14, in the case of receiving a registration request of administrator information from the administrator terminal 120 (S101), the administrator information registration unit 132 of the user management server 130 generates an administrator list based on the relevant administrator information (e.g., administrator ID, e-mail address of the administrator terminal 120, and so forth), the user ID of a user managed by the relevant administrator, and so forth (S103). Also, in response to a request from the administrator terminal 120, the administrator information registration unit 132 can update the administrator list even after the initial registration. Further, the administrator information registration unit 132 records the generated or updated administrator list in the storage unit 131 (S103).

Next, in a case wherein a viewing and listening request regarding a predetermined content has been performed by the user, and in the case of the display apparatus 140 determining that viewing and listening restriction has been set to the relevant content in response to the viewing and listening request thereof, the user information obtaining unit 133 obtains user information including the user ID from the display apparatus 140. The user information obtained from the display apparatus 140 is information which the display apparatus 140 obtained from the user terminal 110. Usually, when the user information obtaining unit 133 obtains the user information, at the same time the user information obtaining unit 133 receives an inquiry from the display apparatus 140 relating to whether or not the content of which the viewing and listening has been requested from the user is permitted by the administrator (S105). Also, the user information which the user information obtaining unit 133 obtains at this time may include not only the ID of the user but also the personal information of the user, the e-mail address of the user terminal 110, and so forth. However, in a case wherein user personal information and so forth are provided to the display apparatus 140 from the user terminal 110 once, it is desirable from the perspective of security that user personal information and so forth are not included at the time of obtaining of user information at the second time and thereafter. Also, the user information obtaining unit 133 obtains information for identifying a content according to the inquiry from the display apparatus 140 at the same time as obtaining of user information.

Next, the viewing and listening licensed state determining unit 134 determines whether or not the content of which the viewing and listening has been requested by the user is permitted to be viewed and listened by the administrator, based on the administrator list stored in the storage unit 131, the user information which the user information obtaining unit 133 obtained, and information for identifying the content (S107). As a determination result thereof, in the case of determining that the requested content is a content of which the viewing and listening has already been permitted, the viewing and listening licensed state determining unit 134 transmits a notice to that effect to the display apparatus 140 (S109).

On the other hand, in the case of the viewing and listening licensed state determining unit 134 determining that the content of which the viewing and listening has been requested by the user has not been permitted to be viewed and listened, the viewing and listening permission request transmission unit 135 transmits a message for requesting permission for the viewing and listening of the content of which the viewing and listening has been requested, to the administrator terminal 120 (S111). The form of transmission of this message is not restricted to a particular form, but for example, this message can be transmitted in an e-mail format based on the e-mail address of the administrator terminal 120 included in the administrator list stored in the storage unit 131.

Next, the viewing and listening licensed information obtaining unit 136 receives viewing and listening licensed information relating to propriety of permission for viewing and listening by the administrator as to the content of which the viewing and listening has been requested, from the administrator terminal 120 (S113). At this time, the viewing and listening licensed information obtaining unit 136 may receive information for identifying a content corresponding to the relevant viewing and listening licensed information, the user ID of the user who has requested viewing and listening of the content thereof, and so forth. Also, in a case wherein the viewing and listening licensed information is information for permitting the viewing and listening of the content which the viewing and listening has been requested, the viewing and listening licensed information obtaining unit 136 records the permitted content in the licensed contents list stored in the storage unit 131 in a correlated manner with user ID of the permitted user.

Subsequently, in the case of receiving viewing and listening licensed information relating to the received propriety of permission for viewing and listening, the viewing and listening licensed information obtaining unit 136 confirms whether or not the content of which the viewing and listening has been requested has been permitted to be viewed and listened by the administrator based on the content of the viewing and listening licensed information (S115).

As a confirmation result thereof, in the case of determining that the viewing and listening has been permitted, the viewing and listening licensed information providing unit 137 transmits a notice to the effect that the viewing and listening has been permitted, to the user terminal 110 (S109). At this time, the viewing and listening licensed information providing unit 137 transmits information for identifying a content corresponding to the relevant viewing and listening licensed information, the user ID of the user who has requested the viewing and listening of the content thereof, and so forth, to the user terminal 110.

On the other hand, as a result of the confirmation in step S115, in the case of determining that the viewing and listening has not been permitted, the viewing and listening licensed information providing unit 137 transmits a notice to the effect that the viewing and listening has not been permitted, to the user terminal 110 (S119).

While a preferred embodiment has been described with reference to the attached drawings, it goes without saying that the present invention is not restricted to this example. It is apparent that one skilled in the art can conceive various modifications or alternations within the scope of the technical idea laid forth in the Claims, and it should be understood that those also belong as a matter of course to the technical scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A contents viewing and listening management apparatus, which is connected through a network to first terminals employed by users whose viewing and listening of a predetermined content is restricted, second terminals employed by administrators who manage viewing and listening of content by said users, a display apparatus configured to display the predetermined content, and a payment server configured to perform payment processing as to purchase of the predetermined content, for managing information relating to said users and said administrators, said contents viewing and listening management apparatus comprising:

at least one processor; and a memory device storing instructions for configuring the at least one processor, wherein the at least one processor is configured by the instructions to:

record a licensed contents list relating to contents of which the viewing and listening is permitted as to each of said users in a correlated manner with user IDs for identifying said users;

record an administrator list, which includes administrator IDs for identifying said administrators, an e-mail address of the relevant administrator correlated with each of said administrator IDs, and the user IDs of said users whose viewing and listening of content is managed by the relevant administrator correlated with each of said administrator IDs;

obtain user information comprising a viewing and listening request of the predetermined content, relevant user ID, in a case wherein a determination is made that authentication is needed for the viewing and listening of the predetermined content based on information included in meta data of the predetermined content, and user personal information, in a case wherein a determination is made that a viewing and listening restriction is set to the predetermined content based on the user ID and the information included in the meta data of the predetermined content;

determine whether or not said viewing and listening of the content of which the viewing and listening has been requested is permitted by said administrator based on said licensed contents list, said user ID, and user personal information;

transmit a message for requesting permission for viewing and listening of said content of which the viewing and listening has been requested, to said second terminal, in a case wherein said content of which the viewing and listening has been requested is not permitted to be viewed and listened;

wherein the display apparatus is configured to determine whether authentication is needed and whether the viewing and listening restriction is set to the predetermined content; and perform payment processing as to purchase of the predetermined content wherein the display apparatus is further configured to request payment processing as to purchase of said content of which the viewing and listening has been permitted, to said payment server, and wherein said payment server performs payment processing as to purchase of said content of which the viewing and listening has been permitted, as to said first terminal, in response to the request for payment processing.

2. The contents viewing and listening management apparatus according to claim 1, wherein the at least one processor is further configured to:

obtain viewing and listening licensed information relating to propriety of permission for viewing and listening determined by said administrator as to said content of which the viewing and listening has been requested, from said second terminal;

provide said obtained viewing and listening licensed information, and licensed content information for identifying said content of which the viewing and listening has been permitted, to said first terminal.

3. The contents viewing and listening management apparatus according to claim 2, wherein said licensed contents list includes said user IDs, information for identifying said content of which the viewing and listening has been permitted, which has been correlated with each of said user IDs, and an e-mail address of the relevant user correlated with each of said user IDs.

4. The contents viewing and listening management apparatus according to claim 1, wherein the at least one processor is further configured to:

register information relating to said administrator in response to a request from said second terminal, and also generating said administrator list.

5. A contents viewing and listening management method employing a contents viewing and listening management apparatus, wherein, in a case in which a viewing and listening request of a predetermined content has been performed as to a display apparatus for displaying the predetermined content, information relating to users whose viewing and listening of the relevant predetermined content is restricted, and information relating to administrators who manage viewing and listening of content by said users are managed, said method comprising the steps of:

providing the viewing and listening request of the predetermined content to the display apparatus for displaying the predetermined content;

determining whether authentication is needed for the viewing and listening of the predetermined content based on information included in meta data of the predetermined content;

obtaining relevant user ID from said display apparatus in a case wherein authentication is needed;

recording an administrator list, which includes, administrator IDs for identifying said administrators, an e-mail address of the relevant administrator correlated with each of said administrator IDs, and the user IDs of said users whose viewing and listening of content is managed by the relevant administrator correlated with each of said administrator IDs;

determining whether a viewing and listening restriction is set to the predetermined content based on the user ID and the information included in the metadata of the predetermined content;

obtaining user personal information from said display apparatus in a case wherein the determination is made that viewing and listening restriction is set to the predetermined content;

determining whether the predetermined content is licensed based on the user ID, the user personal information, and a licensed contents list relating to contents of which the viewing and listening has been permitted by the administrator as to each of the users;

transmitting a message which requests permission for viewing and listening of the predetermined content to said second terminal possessed by said administrator, in a case wherein the predetermined content is not licensed; and transmitting to a payment processing server a payment processing request as to purchase of said content of which the viewing and listening has been permitted.

6. A non-transitory computer-readable storage medium storing a computer program for executing processing with a contents viewing and listening management apparatus, which is connected through a network to first terminals employed by users whose viewing and listening of a predetermined content is restricted, second terminals employed by administrators who manage viewing and listening of content by said users, a payment server configured to perform payment processing as to purchase of the predetermined content, and a display apparatus configured to display the predetermined content, for managing information relating to said users and said administrators which, when executed by a computer, performs a method, the method including:

a recording function configured to record a licensed contents list relating to contents of which the viewing and listening is permitted as to each of said users in a correlated manner with user IDs for identifying said users;

a user information obtaining function configured to obtain a viewing and listening request of the predetermined content,
relevant user ID, in a case wherein a determination is made that authentication is needed for the viewing and listening of the predetermined content based on information included in meta data of the predetermined content, and
user personal information, in a case wherein a determination is made that a viewing and listening restriction is set to the predetermined content based on the user ID and the information included in the meta data of the predetermined content;

an administrator information recording function configured to record an administrator list, which includes administrator IDs for identifying said administrators,
an e-mail address of the relevant administrator correlated with each of said administrator IDs, and
the user IDs of said users whose viewing and listening of content is managed by the relevant administrator correlated with each of said administrator IDs;

a viewing and listening licensed state determining function configured to determine whether or not viewing and listening of said content of which viewing and listening has been requested is permitted by said administrator based on said licensed contents list, said user ID, and user personal information;

a viewing and listening permission request transmitting function configured to transmit a message for requesting permission for viewing and listening of said content of which the viewing and listening has been requested, to said second terminal, in a case wherein said content of which the viewing and listening has been requested is not permitted to be viewed and listened;
wherein the display apparatus is configured to determine whether authentication is needed and whether the viewing and listening restriction is set to the predetermined content; and a payment processing request function configured to request payment processing as to purchase of said content of which the viewing and listening has been permitted, to said payment server,
and wherein said payment server includes a payment processing function configured to perform payment processing as to purchase of said content of which the viewing and listening has been permitted, as to said first terminal, in response to the request for payment processing by said payment processing request function.

7. A contents viewing and listening management system comprising:
first terminals employed by users whose viewing and listening of a predetermined content is restricted;
second terminals employed by administrators who manage viewing and listening of content by said users;
a user management server configured to manage information relating to said users and said administrators;
a display apparatus configured to display the predetermined content;
a contents distribution server configured to distribute a content to said display apparatus; and
a payment server configured to perform payment processing as to purchase of the predetermined content;
wherein said first terminal includes
at least one processor; and
a memory device storing instructions for configuring the at least one processor,
wherein the at least one processor is configured by the instructions to:
record user IDs for determining said users
provide the following to the display apparatus:
a viewing and listening request of the predetermined content,
relevant user ID, in a case wherein the determination is made that authentication is needed for the viewing and listening of the predetermined content based on information included in meta data of the predetermined content, and
user personal information, in a case wherein the determination is made that a viewing and listening restriction is set to the predetermined content based on the user ID and the information included in the meta data of the predetermined content;
and wherein said display apparatus includes
at least one processor; and
a memory device storing instructions for configuring the at least one processor,
wherein the at least one processor is configured by the instructions to:
record in a correlated manner with said user IDs a viewing and listening restricting list which is viewing and listening restriction information relating to contents of which the viewing and listening by each of said users is restricted,
obtain meta data of a single or multiple contents from said contents distribution server,
obtain at least said user ID and user personal information from said first terminal,
determine whether or not authentication is needed and whether viewing and listening restriction of the relevant content has been set based on said meta data, said user ID, said viewing and listening restricting list in response to a viewing and listening request regarding the predetermined content,
provide said user ID and user personal information obtained from said first terminal to said user management server in a case wherein determination is made that said viewing and listening restriction has been set; and
request payment processing as to purchase of said content of which the viewing and listening has been permitted, to said payment server,
and wherein said user management server includes at least one processor; and a memory device storing instructions for configuring the at least one processor, wherein the at least one processor is configured by the instructions to:

record in a correlated manner with said user IDs a licensed contents list of contents of which the viewing and listening has been permitted as to each of said users, obtain said user ID and user personal information from said display apparatus, record an administrator list, which includes administrator IDs for identifying said administrators, an e-mail address of the relevant administrator correlated with each of said administrator IDs, and the user IDs of said users whose viewing and listening of content is managed by the relevant administrator correlated with each of said administrator IDs;

determine whether or not said content of which the viewing and listening has been requested is permitted to be viewed and listened by said administrator based on said licensed contents list, said user ID, and user personal information, and transmit a message for requesting permission for viewing and listening of said content of which the viewing and listening has been requested, to said second terminal, in a case wherein said content of which the viewing and listening has been requested is not permitted to be viewed and listened;

and wherein said second terminal includes at least one processor; and a memory device storing instructions for configuring the at least one processor, wherein the at least one processor is configured by the instructions to:

receive said message which requests permission for viewing and listening;

and wherein said payment server includes at least one processor; and a memory device storing instructions for configuring the at least one processor, wherein the at least one processor is configured by the instructions to:

perform payment processing as to purchase of said content of which the viewing and listening has been permitted, as to said first terminal, in response to the request for payment processing.

8. The contents viewing and listening management system according to claim 7, wherein the at least one processor of said second terminal is further configured to input viewing and listening licensed information relating to propriety of permission for viewing and listening determined by said administrator as to said content of which the viewing and listening has been requested, and provide said viewing and listening licensed information to said user management server;

and wherein the at least one processor of said user management server is further configured to obtain said viewing and listening licensed information corresponding to said content of which the viewing and listening has been requested, from said second terminal, and provide said obtained viewing and listening licensed information, and licensed content information for identifying said content of which the viewing and listening has been permitted, to said first terminal.

9. The contents viewing and listening management system according to claim 8, wherein the at least one processor of said first terminal is further configured to:

obtain said viewing and listening licensed information, and said licensed content information from said user management server; and provide said obtained viewing and listening licensed information and said licensed content information to said display apparatus;

and wherein the at least one processor of said display apparatus is further configured to obtain said viewing and listening licensed information and said licensed content information from said first terminal or said user management server, transmit a distribution request of said content of which the viewing and listening has been permitted to said contents distribution server together with said viewing and listening licensed information and said licensed content information, obtain said content of which the viewing and listening has been permitted from said contents distribution server in response to said content distribution request, and play said obtained content of which the viewing and listening has been permitted.

10. The contents viewing and listening management system according to claim 8, wherein said licensed contents list includes said user IDs, information for identifying said content of which the viewing and listening has been permitted, which has been correlated with each of said user IDs, and an e-mail address of the relevant user correlated with each of said user IDs.

11. The contents viewing and listening management system according to claim 7, wherein said viewing and listening restricting list includes said user IDs, a name of the relevant user correlated with each of said user IDs, and restricted content information showing the content of viewing and listening restriction of the relevant user correlated with each of said user IDs.

12. The contents viewing and listening management system according to claim 7, wherein said first terminal is an IC card.

* * * * *